(12) United States Patent
Yuan et al.

(10) Patent No.: US 11,548,808 B2
(45) Date of Patent: Jan. 10, 2023

(54) MICROCRYSTALLINE GLASS, MICROCRYSTALLINE GLASS PRODUCT AND MANUFACTURING METHOD THEREOF

(71) Applicant: CDGM GLASS CO., LTD., Chengdu (CN)

(72) Inventors: Baoping Yuan, Chengdu (CN); Tianlai Yu, Chengdu (CN); Sai Li, Chengdu (CN); Tao Jiang, Chengdu (CN); Xuemei Chen, Chengdu (CN); Yong Su, Chengdu (CN); Xiaobing Nie, Chengdu (CN); Zhenyu Liu, Chengdu (CN)

(73) Assignee: CDGM GLASS CO., LTD., Chengdu (CN)

( * ) Notice: Subject to any disclaimer, the term of this patent is extended or adjusted under 35 U.S.C. 154(b) by 0 days.

(21) Appl. No.: 17/551,109

(22) Filed: Dec. 14, 2021

(65) Prior Publication Data
US 2022/0204389 A1    Jun. 30, 2022

(30) Foreign Application Priority Data

Dec. 31, 2020  (CN) .......................... 202011645700.8

(51) Int. Cl.
| | | |
|---|---|---|
| *C03C 10/04* | (2006.01) | |
| *C03C 21/00* | (2006.01) | |
| *C03B 32/02* | (2006.01) | |
| *C03C 10/00* | (2006.01) | |
| *C03C 4/02* | (2006.01) | |
| *C03C 4/18* | (2006.01) | |

(52) U.S. Cl.
CPC .......... *C03C 10/0009* (2013.01); *C03B 32/02* (2013.01); *C03C 4/02* (2013.01); *C03C 4/18* (2013.01); *C03C 10/0054* (2013.01); *C03C 21/002* (2013.01); *C03C 2204/00* (2013.01)

(58) Field of Classification Search
CPC .. C03C 10/0009; C03C 10/0027; C03C 10/00
See application file for complete search history.

(56) References Cited

U.S. PATENT DOCUMENTS

| | | | | |
|---|---|---|---|---|
| 10,676,390 | B2 * | 6/2020 | Yuan ...................... | C03C 3/085 |
| 10,913,681 | B2 * | 2/2021 | Yuan ...................... | C03C 3/097 |
| 2019/0099244 | A1 * | 4/2019 | Vollmann ................ | A61C 5/77 |
| 2020/0131080 | A1 * | 4/2020 | Yuan ...................... | C03C 3/085 |
| 2020/0277221 | A1 * | 9/2020 | Yuan ...................... | C03C 3/085 |
| 2020/0346969 | A1 * | 11/2020 | Li ........................... | C03C 1/004 |

FOREIGN PATENT DOCUMENTS

| | | | |
|---|---|---|---|
| CN | 110482866 A | 11/2019 | |
| WO | WO-2019167850 A1 * | 9/2019 | ........... C03B 23/023 |

OTHER PUBLICATIONS

First Office Action issued in Chinese Application No. 202011645700.8; dated Jun. 4, 2021; 47 pgs.
Second Office Action issued in Chinese Application No. 202011645700.8; dated Aug. 4, 2021; 43 pgs.
Search Report issued in Chinese Application No. 202011645700.8; dated May 28, 2021; 1 pg.

* cited by examiner

*Primary Examiner* — Karl E Group
(74) *Attorney, Agent, or Firm* — Hauptman Ham, LLP

(57) ABSTRACT

The present invention provides a microcrystalline glass product. The microcrystalline glass product includes the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%. Through reasonable component design, the microcrystalline glass and the microcrystalline glass product obtained in the present invention have excellent mechanical and optical properties and are suitable for electronic devices or display devices.

30 Claims, No Drawings

MICROCRYSTALLINE GLASS, MICROCRYSTALLINE GLASS PRODUCT AND MANUFACTURING METHOD THEREOF

RELATED APPLICATIONS

The present application claims priority from Chinese Application Number 202011645700.8, filed Dec. 31, 2020, the disclosure of which is hereby incorporated by reference herein in its entirety.

TECHNICAL FIELD

The present invention relates to microcrystalline glass, microcrystalline glass product and manufacturing method thereof, and in particular, to microcrystalline glass, microcrystalline glass product with excellent mechanical and optical properties and suitable for electronic devices or display devices, and manufacturing methods thereof.

BACKGROUND

Microcrystalline glass is a material that precipitates crystals in glass through thermal treatment. It has better mechanical properties than conventional glass and forms crystallites in the glass. Its bending resistance, wear resistance, drop resistance and other properties have significant advantages over conventional glass. On the other hand, the microcrystalline glass can also be chemically strengthened to further improve the mechanical properties.

Based on the advantages above, at present, microcrystalline glass or glass products obtained after treating the microcrystalline glass are applied to display devices or electronic devices with higher requirements such as drop resistance, compression resistance, and scratch resistance, especially to front and back covers of portable electronic devices (e.g., mobile phones, watches, PAD, etc.).

With the development of science and technology, the electronic devices or the display devices have higher requirements on optical properties of glass materials used therein. The optical properties refer to the properties of the materials in absorption, reflection and refraction of light, including transmittance, haze, |B| value and refractive index, etc. However, the microcrystalline glass currently available in the market have problems such as poor chemical strengthening performance, high haze, and large |B| value, and are thus difficult to be applied to display devices or electronic devices with higher requirements.

Therefore, developing a microcrystalline glass and a microcrystalline glass product with excellent mechanical and optical properties and suitable for display devices or electronic devices has become a pursuit of scientific and technical personnel.

SUMMARY

The technical problem to be solved by the present invention is to provide a microcrystalline glass product with excellent mechanical and optical properties.

The technical solution adopted by the present invention for solving the technical problem is as follows:

(1) A microcrystalline glass product, including the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%.

(2) The microcrystalline glass product according to (1) further includes the following components in percentage by weight: $K_2O$: 0-5%; and/or MgO: 0-2%; and/or ZnO: 0-2%; and/or $Na_2O$: 0-6%; and/or SrO: 0-5%; and/or BaO: 0-5%; and/or CaO: 0-5%; and/or $TiO_2$: 0-5%; and/or $B_2O_3$: 0-5%; and/or $Ln_2O_3$: 0-5%; and/or a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(3) The microcrystalline glass product includes the following components: $SiO_2$, $Al_2O_3$, $Li_2O$, $ZrO_2$, $P_2O_5$, and $Y_2O_3$. A crystal phase of the microcrystalline glass product includes lithium monosilicate. The lithium monosilicate has a higher weight percentage than other crystal phases.

(4) The microcrystalline glass product includes the following components: $SiO_2$, $Al_2O_3$, $Li_2O$, $ZrO_2$, and $P_2O_5$. An average light |B| value of the microcrystalline glass product with a thickness of 1 mm or less at 400-800 nm is 0.6 or less.

(5) The microcrystalline glass product includes a lithium monosilicate crystal phase. A drop ball test height of the microcrystalline glass product is 1300 mm or more.

(6) The microcrystalline glass product according to any one of (3) to (5) includes the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%.

(7) The microcrystalline glass product according to any one of (3) to (6) further includes the following components in percentage by weight: $K_2O$: 0-5%; and/or MgO: 0-2%; and/or ZnO: 0-2%; and/or $Na_2O$: 0-6%; and/or SrO: 0-5%; and/or BaO: 0-5%; and/or CaO: 0-5%; and/or $TiO_2$: 0-5%; and/or $B_2O_3$: 0-5%; and/or $Ln_2O_3$: 0-5%; and/or a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(8) The microcrystalline glass product includes the following components in percentage by weight: $SiO_2$: 45-70%; $Al_2O_3$: 8-18%; $Li_2O$: 10-25%; $ZrO_2$: 5-15%; $P_2O_5$: 2-10%; $Y_2O_3$: greater than 0 but less than or equal to 8%; $K_2O$: 0-5%; MgO: 0-2%; ZnO: 0-2%; $Na_2O$: 0-6%; SrO: 0-5%; BaO: 0-5%; CaO: 0-5%; $TiO_2$: 0-5%; $B_2O_3$: 0-5%; $Ln_2O_3$: 0-5%; and a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(9) The microcrystalline glass product according to any one of (1) to (8), where the content of each component satisfies more than one of the following five situations:
 1) $Y_2O_3/ZrO_2$ is greater than 0;
 2) $(Li_2O+ZrO_2+P_2O_5)/Y_2O_3$ is 2.5-50.0;
 3) $Al_2O_3/(Li_2O+ZrO_2+P_2O_5)$ is 0.16-0.9;
 4) $Na_2O/Y_2O_3$ is 6.0 or less; and
 5) $Y_2O_3/(Al_2O_3+SiO_2)$ is greater than 0 but less than or equal to 0.15.

(10) The microcrystalline glass product according to any one of (1) to (9) includes the following components in percentage by weight: $SiO_2$: 50-65%; and/or $Al_2O_3$: 8-15%; and/or $Li_2O$: 13-22%; and/or $ZrO_2$: 6-12%; and/or $P_2O_5$: 3.5-9%; and/or $K_2O$: 0-4%; and/or MgO: 0-1%; and/or ZnO: 0-1%; and/or $Na_2O$: 1-5%; and/or $Y_2O_3$: 1-7%; and/or SrO: 0-3%; and/or BaO: 0-3%; and/or CaO: 0-3%; and/or $TiO_2$: 0-3%; and/or $B_2O_3$: 0-3%; and/or $Ln_2O_3$: 0-4%; and/or a clarifying agent: 0-1%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(11) The microcrystalline glass product according to any one of (1) to (10), where the content of each component satisfies more than one of the following five situations:

1) $Y_2O_3/ZrO_2$ is 0.1-1.0;
2) $(Li_2O+ZrO_2+P_2O_5)/Y_2O_3$ is 3.0-40.0;
3) $Al_2O_3/(Li_2O+ZrO_2+P_2O_5)$ is 0.18-0.6;
4) $Na_2O/Y_2O_3$ is 0.1-5.0; and
5) $Y_2O_3/(Al_2O_3+SiO_2)$ is 0.01-0.12.

(12) The microcrystalline glass product according to any one of (1) to (11) includes the following components in percentage by weight: $SiO_2$: 53-63%; and/or $Al_2O_3$: 8-12%; and/or $Li_2O$: 14-21%; and/or $ZrO_2$: 7-12%; and/or $P_2O_5$: 4-8%; and/or $K_2O$: 0-2%; and/or $Y_2O_3$: 2-6%; and/or $B_2O_3$: 0-2%; and/or $Na_2O$: 1.5-4%; and/or SrO: 0-1%; and/or $TiO_2$: 0-1%; and/or BaO: 0-1%; and/or CaO: 0-1%; and/or $Ln_2O_3$: 0-3%; and/or a clarifying agent: 0-0.5%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(13) The microcrystalline glass product according to any one of (1) to (12), where the content of each component satisfies more than one of the following five situations:
1) $Y_2O_3/ZrO_2$ is 0.2-0.6;
2) $(Li_2O+ZrO_2+P_2O_5)/Y_2O_3$ is 4.0-21.0;
3) $Al_2O_3/(Li_2O+ZrO_2+P_2O_5)$ is 0.19-0.5;
4) $Na_2O/Y_2O_3$ is 0.3-2.0; and
5) $Y_2O_3/(Al_2O_3+SiO_2)$ is 0.03-0.09.

(14) The microcrystalline glass product according to any one of (1) to (13) excludes SrO; and/or excludes BaO; and/or excludes CaO; and/or excludes ZnO; and/or excludes PbO; and/or excludes $As_2O_3$; and/or excludes $TiO_2$; and/or excludes $B_2O_3$; and/or excludes $Ln_2O_3$; and/or excludes F; and/or excludes $Ta_2O_5$.

(15) The microcrystalline glass product according to any one of (1) to (14), where a crystal phase of the microcrystalline glass product includes lithium monosilicate and/or lithium phosphate.

(16) The microcrystalline glass product according to any one of (1) to (15), where the crystal phase of the microcrystalline glass product mainly includes lithium monosilicate, the lithium monosilicate has a higher weight percentage than other crystal phases, and the lithium monosilicate accounts for 10-63.5% of the microcrystalline glass product, and preferably 15-55%.

(17) The microcrystalline glass product according to any one of (1) to (16), where the microcrystalline glass product includes a lithium phosphate crystal phase, and the lithium phosphate crystal phase accounts for 3-15% of the microcrystalline glass product, and preferably 5-12%.

(18) The microcrystalline glass product according to any one of (1) to (17), where a surface stress of the microcrystalline glass product is 600 MPa or more, preferably 650 MPa or more, and more preferably 700 MPa or more.

(19) The microcrystalline glass product according to any one of (1) to (18), where a four-point bending strength of the microcrystalline glass product is 600 MPa or more, preferably 650 MPa or more, and more preferably 700 MPa or more.

(20) The microcrystalline glass product according to any one of (1) to (19), where an ion-exchange layer depth of the microcrystalline glass product is 20 μm or more, preferably 30 μm or more, and more preferably 40 μm or more.

(21) The microcrystalline glass product according to any one of (1) to (20), where a drop ball test height of the microcrystalline glass product is 1300 mm or more, preferably 1400 mm or more, and more preferably 1500 mm or more.

(22) The microcrystalline glass product according to any one of (1) to (21), where fracture toughness of the microcrystalline glass product is 1 $MPa·m^{1/2}$ or more, preferably 1.1 $Mpa·m^{1/2}$ or more, and more preferably 1.2 $Mpa·m^{1/2}$ or more.

(23) The microcrystalline glass product according to any one of (1) to (22), where Vickers hardness of the microcrystalline glass product is 700 $kgf/mm^2$ or more, preferably 720 $kgf/mm^2$ or more, and more preferably 730 $kgf/mm^2$ or more.

(24) The microcrystalline glass product according to any one of (1) to (23), where a crystallinity of the microcrystalline glass product is 50% or more, preferably 60% or more, and more preferably 70% or more.

(25) The microcrystalline glass product according to any one of (1) to (24), where a grain size of the microcrystalline glass product is 50 nm or less, preferably 40 nm or less, and more preferably 30 nm or less.

(26) The microcrystalline glass product according to any one of (1) to (15), where a haze of the microcrystalline glass product with a thickness of 1 mm or less is 0.15% or less, preferably 0.12% or less, and more preferably 0.1% or less.

(27) The microcrystalline glass product according to any one of (1) to (26), where average transmittance of the microcrystalline glass product with the thickness of 1 mm or less at a wavelength of 400-800 nm is 89% or more.

(28) The microcrystalline glass product according to any one of (1) to (27), where transmittance of the microcrystalline glass product with the thickness of 1 mm or less at the wavelength of 550 nm is 91% or more.

(29) The microcrystalline glass product according to any one of (1) to (28), where an average light |B| value of the microcrystalline glass product with the thickness of 1 mm or less at 400-800 nm is 0.6 or less, preferably 0.55 or less, and more preferably 0.5 or less.

(30) The microcrystalline glass product according to any one of (26) to (29), where the thickness of the microcrystalline glass product is 0.2-1 mm, preferably 0.3-0.9 mm, more preferably 0.5-0.8 mm, and further preferably 0.55 mm or 0.6 mm or 0.68 mm or 0.72 mm or 0.75 mm.

(31) The microcrystalline glass product according to any one of (1) to (7), where the microcrystalline glass product includes a colorant.

(32) The microcrystalline glass product according to (31), where the colorant includes the following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

(33) The microcrystalline glass product according to either (31) or (32), where the colorant includes the following components in percentage by weight: NiO: 0.1-4%; and/or $Ni_2O_3$: 0.1-4%; and/or CoO: 0.05-2%; and/or $Co_2O_3$: 0.05-2%; and/or $Fe_2O_3$: 0.2-7%; and/or $MnO_2$: 0.1-4%; and/or $Er_2O_3$: 0.4-8%; and/or $Nd_2O_3$: 0.4-8%; and/or $Cu_2O$: 0.5-4%; and/or $Pr_2O_3$: 0.4-8%; and/or $CeO_2$: 0.5-4%.

(34) The microcrystalline glass product according to either (31) or (32), where the colorant includes the following components in percentage by weight: NiO: 0.1-3%; and/or $Ni_2O_3$: 0.1-3%; and/or CoO: 0.05-1.8%; and/or $Co_2O_3$: 0.05-1.8%; and/or $Fe_2O_3$: 0.2-5%; and/or $MnO_2$: 0.1-3%; and/or $Er_2O_3$: 0.4-6%; and/or $Nd_2O_3$: 0.4-6%; and/or $Cu_2O$: 0.5-3%; and/or $Pr_2O_3$: 0.4-6%; and/or $CeO_2$: 0.5-3%.

(35) The microcrystalline glass product according to either (31) or (32), where the colorant includes the following components in percentage by weight: NiO: 0.1-3%; and/or $Ni_2O_3$: 0.1-3%.

(36) The microcrystalline glass product according to either (31) or (32), where the colorant includes the following components in percentage by weight: CoO: 0.05-1.8%; and/or $Co_2O_3$: 0.05-1.8%.

(37) The microcrystalline glass product according to either (31) or (32), where the colorant includes the following components in percentage by weight: $Cu_2O$: 0.5-3%; and/or $CeO_2$: 0.5-3%.

(38) The microcrystalline glass product according to either (31) or (32), where the colorant includes the following components in percentage by weight: $Fe_2O_3$: 0.2-5%, and CoO: 0.05-0.3%; or $Fe_2O_3$: 0.2-5%, and $Co_2O_3$: 0.05-0.3%; or $Fe_2O_3$: 0.2-5%, CoO: 0.05-0.3%, and NiO: 0.1-1%; or $Fe_2O_3$: 0.2-5%, $Co_2O_3$: 0.05-0.3%, and NiO: 0.1-1%.

(39) The microcrystalline glass product according to either (31) or (32), where the colorant includes the following components in percentage by weight: $Pr_2O_3$: 0.4-6%; or $Fe_2O_3$: 0.2-5%; or $MnO_2$: 0.1-3%; or $Er_2O_3$: 0.4-6%; or $Nd_2O_3$: 0.4-6%.

(40) The microcrystalline glass product according to either (31) or (32), where the colorant includes the following components in percentage by weight: $Er_2O_3$: 0.4-6%, $Nd_2O_3$: 0.4-4%, and $MnO_2$: 0.1-2%.

The present invention further provides a microcrystalline glass with excellent mechanical and optical properties.

The technical solution adopted by the present invention for solving the technical problem is as follows:

(41) A microcrystalline glass, including the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%.

(42) The microcrystalline glass according to (41) further includes the following components in percentage by weight: $K_2O$: 0-5%; and/or MgO: 0-2%; and/or ZnO: 0-2%; and/or $Na_2O$: 0-6%; and/or SrO: 0-5%; and/or BaO: 0-5%; and/or $TiO_2$: 0-5%; and/or CaO: 0-5%; and/or $B_2O_3$: 0-5%; and/or $Ln_2O_3$: 0-5%; and/or a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(43) The microcrystalline glass includes the following components: $SiO_2$, $Al_2O_3$, $Li_2O$, $ZrO_2$, $P_2O_5$, and $Y_2O_3$. A crystal phase of the microcrystalline glass includes lithium monosilicate. The lithium monosilicate has a higher weight percentage than other crystal phases.

(44) The microcrystalline glass includes the following components: $SiO_2$, $Al_2O_3$, $Li_2O$, $ZrO_2$, and $P_2O_5$. An average light |B| value of the microcrystalline glass with a thickness of 1 mm or less at 400-800 nm is 0.6 or less.

(45) The microcrystalline glass includes a lithium monosilicate crystal phase. A body drop height of the microcrystalline glass is 1000 mm or more.

(46) The microcrystalline glass according to any one of (43) to (45) includes the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%.

(47) The microcrystalline glass according to any one of (43) to (46) further includes the following components in percentage by weight: $K_2O$: 0-5%; and/or MgO: 0-2%; and/or ZnO: 0-2%; and/or $Na_2O$: 0-6%; and/or SrO: 0-5%; and/or BaO: 0-5%; and/or CaO: 0-5%; and/or $TiO_2$: 0-5%; and/or $B_2O_3$: 0-5%; and/or $Ln_2O_3$: 0-5%; and/or a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(48) The microcrystalline glass includes the following components in percentage by weight: $SiO_2$: 45-70%; $Al_2O_3$: 8-18%; $Li_2O$: 10-25%; $ZrO_2$: 5-15%; $P_2O_5$: 2-10%; $Y_2O_3$: greater than 0 but less than or equal to 8%; $K_2O$: 0-5%; MgO: 0-2%; ZnO: 0-2%; $Na_2O$: 0-6%; SrO: 0-5%; BaO: 0-5%; CaO: 0-5%; $TiO_2$: 0-5%; $B_2O_3$: 0-5%; $Ln_2O_3$: 0-5%; and a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(49) The microcrystalline glass according to any one of (41) to (48), where the components are expressed in percentage by weight, and the content of each component satisfies more than one of the following five situations:
1) $Y_2O_3/ZrO_2$ is greater than 0;
2) $(Li_2O+ZrO_2+P_2O_5)/Y_2O_3$ is 2.5-50.0;
3) $Al_2O_3/(Li_2O+ZrO_2+P_2O_5)$ is 0.16-0.9;
4) $Na_2O/Y_2O_3$ is 6.0 or less; and
5) $Y_2O_3/(Al_2O_3+SiO_2)$ is greater than 0 but less than or equal to 0.15.

(50) The microcrystalline glass according to any one of (41) to (49) includes the following components in percentage by weight: $SiO_2$: 50-65%; and/or $Al_2O_3$: 8-15%; and/or $Li_2O$: 13-22%; and/or $ZrO_2$: 6-12%; and/or $P_2O_5$: 3.5-9%; and/or $K_2O$: 0-4%; and/or MgO: 0-1%; and/or ZnO: 0-1%; and/or $Na_2O$: 1-5%; and/or $Y_2O_3$: 1-7%; and/or SrO: 0-3%; and/or $TiO_2$: 0-3%; and/or BaO: 0-3%; and/or CaO: 0-3%; and/or $B_2O_3$: 0-3%; and/or $Ln_2O_3$: 0-4%; and/or a clarifying agent: 0-1%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(51) The microcrystalline glass according to any one of (41) to (50), where the components are expressed in percentage by weight, and the content of each component satisfies more than one of the following five situations:
1) $Y_2O_3/ZrO_2$ is 0.1-1.0;
2) $(Li_2O+ZrO_2+P_2O_5)/Y_2O_3$ is 3.0-40.0;
3) $Al_2O_3/(Li_2O+ZrO_2+P_2O_5)$ is 0.18-0.6;
4) $Na_2O/Y_2O_3$ is 0.1-5.0; and
5) $Y_2O_3/(Al_2O_3+SiO_2)$ is 0.01-0.12.

(52) The microcrystalline glass according to any one of (41) to (51) includes the following components in percentage by weight: $SiO_2$: 53-63%; and/or $Al_2O_3$: 8-12%; and/or $Li_2O$: 14-21%; and/or $ZrO_2$: 7-12%; and/or $P_2O_5$: 4-8%; and/or $K_2O$: 0-2%; and/or $Y_2O_3$: 2-6%; and/or $B_2O_3$: 0-2%; and/or $Na_2O$: 1.5-4%; and/or SrO: 0-1%; and/or $TiO_2$: 0-1%; and/or BaO: 0-1%; and/or CaO: 0-1%; and/or $Ln_2O_3$: 0-3%; and/or a clarifying agent: 0-0.5%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(53) The microcrystalline glass according to any one of (41) to (52), where the components are expressed in percentage by weight, and the content of each component satisfies more than one of the following five situations:
1) $Y_2O_3/ZrO_2$ is 0.2-0.6;
2) $(Li_2O+ZrO_2+P_2O_5)/Y_2O_3$ is 4.0-21.0;
3) $Al_2O_3/(Li_2O+ZrO_2+P_2O_5)$ is 0.19-0.5;
4) $Na_2O/Y_2O_3$ is 0.3-2.0; and
5) $Y_2O_3/(Al_2O_3+SiO_2)$ is 0.03-0.09.

(54) The microcrystalline glass according to any one of (41) to (53) excludes SrO; and/or excludes BaO; and/or excludes CaO; and/or excludes ZnO; and/or excludes PbO; and/or excludes $As_2O_3$; and/or excludes $TiO_2$; and/or excludes $B_2O_3$; and/or excludes $Ln_2O_3$; and/or excludes F; and/or excludes $Ta_2O_5$.

(55) The microcrystalline glass according to any one of (41) to (54), where a crystal phase of the microcrystalline glass includes lithium monosilicate and/or lithium phosphate.

(56) The microcrystalline glass according to any one of (41) to (55), where the crystal phase of the microcrystalline glass mainly includes lithium monosilicate, the lithium monosilicate has a higher weight percentage than other crystal phases, and the lithium monosilicate accounts for 10-63.5% of the microcrystalline glass, and preferably 15-55%.

(57) The microcrystalline glass according to any one of (41) to (56), where the microcrystalline glass includes a lithium phosphate crystal phase, and the lithium phosphate crystal phase accounts for 3-15% of the microcrystalline glass, and preferably 5-12%.

(58) The microcrystalline glass according to any one of (41) to (57), where a crystallinity of the microcrystalline glass is 50% or more, preferably 60% or more, and more preferably 70% or more.

(59) The microcrystalline glass according to any one of (41) to (58), where a grain size of the microcrystalline glass is 50 nm or less, preferably 40 nm or less, and more preferably 30 nm or less.

(60) The microcrystalline glass according to any one of (41) to (59), where a coefficient of thermal expansion of the microcrystalline glass is $75\text{-}95 \times 10^{-7}$/K.

(61) The microcrystalline glass according to any one of (41) to (60), where a refractive index of the microcrystalline glass is 1.5700-1.5800.

(62) The microcrystalline glass according to any one of (41) to (61), where a body drop height of the microcrystalline glass is 1000 mm or more, preferably 1100 mm or more, and more preferably 1200 mm or more.

(63) The microcrystalline glass according to any one of (41) to (62), where Vickers hardness of the microcrystalline glass is 650 kgf/mm$^2$ or more, preferably 680 kgf/mm$^2$ or more, and more preferably 700 kgf/mm$^2$ or more.

(64) The microcrystalline glass according to any one of (41) to (63), where a haze of the microcrystalline glass with a thickness of 1 mm or less is 0.15% or less, preferably 0.12% or less, and more preferably 0.1% or less.

(65) The microcrystalline glass according to any one of (41) to (64), where average transmittance of the microcrystalline glass with the thickness of 1 mm or less at a wavelength of 400-800 nm is 89% or more.

(66) The microcrystalline glass according to any one of (41) to (65), where transmittance of the microcrystalline glass with the thickness of 1 mm or less at the wavelength of 550 nm is 91% or more.

(67) The microcrystalline glass according to any one of (41) to (66), where an average light B value of the microcrystalline glass with the thickness of 1 mm or less at 400-800 nm is 0.6 or less, preferably 0.55 or less, and more preferably 0.5 or less.

(68) The microcrystalline glass according to any one of (64) to (67), where the thickness of the microcrystalline glass is 0.2-1 mm, preferably 0.3-0.9 mm, more preferably 0.5-0.8 mm, and further preferably 0.55 mm or 0.6 mm or 0.68 mm or 0.72 mm or 0.75 mm.

(69) The microcrystalline glass according to any one of (41) to (47), where the microcrystalline glass includes a colorant.

(70) The microcrystalline glass according to (69), where the colorant includes the following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

(71) The microcrystalline glass according to either (69) or (70), where the colorant includes the following components in percentage by weight: NiO: 0.1-4%; and/or $Ni_2O_3$: 0.1-4%; and/or CoO: 0.05-2%; and/or $Co_2O_3$: 0.05-2%; and/or $Fe_2O_3$: 0.2-7%; and/or $MnO_2$: 0.1-4%; and/or $Er_2O_3$: 0.4-8%; and/or $Nd_2O_3$: 0.4-8%; and/or $Cu_2O$: 0.5-4%; and/or $Pr_2O_3$: 0.4-8%; and/or $CeO_2$: 0.5-4%.

(72) The microcrystalline glass according to either (69) or (70), where the colorant includes the following components in percentage by weight: NiO: 0.1-3%; and/or $Ni_2O_3$: 0.1-3%; and/or CoO: 0.05-1.8%; and/or $Co_2O_3$: 0.05-1.8%; and/or $Fe_2O_3$: 0.2-5%; and/or $MnO_2$: 0.1-3%; and/or $Er_2O_3$: 0.4-6%; and/or $Nd_2O_3$: 0.4-6%; and/or $Cu_2O$: 0.5-3%; and/or $Pr_2O_3$: 0.4-6%; and/or $CeO_2$: 0.5-3%.

(73) The microcrystalline glass according to either (69) or (70), where the colorant includes the following components in percentage by weight: NiO: 0.1-3%; and/or $Ni_2O_3$: 0.1-3%.

(74) The microcrystalline glass according to either (69) or (70), where the colorant includes the following components in percentage by weight: CoO: 0.05-1.8%; and/or $Co_2O_3$: 0.05-1.8%.

(75) The microcrystalline glass according to either (69) or (70), where the colorant includes the following components in percentage by weight: $Cu_2O$: 0.5-3%; and/or $CeO_2$: 0.5-3%.

(76) The microcrystalline glass according to either (69) or (70), where the colorant includes the following components in percentage by weight: $Fe_2O_3$: 0.2-5%, and CoO: 0.05-0.3%; or $Fe_2O_3$: 0.2-5%, and $Co_2O_3$: 0.05-0.3%; or $Fe_2O_3$: 0.2-5%, CoO: 0.05-0.3%, and NiO: 0.1-1%; or $Fe_2O_3$: 0.2-5%, $Co_2O_3$: 0.05-0.3%, and NiO: 0.1-1%.

(77) The microcrystalline glass according to either (69) or (70), where the colorant includes the following components in percentage by weight: $Pr_2O_3$: 0.4-6%; or $Fe_2O_3$: 0.2-5%; or $MnO_2$: 0.1-3%; or $Er_2O_3$: 0.4-6%; or $Nd_2O_3$: 0.4-6%.

(78) The microcrystalline glass according to either (69) or (70), where the colorant includes the following components in percentage by weight: $Er_2O_3$: 0.4-6%, $Nd_2O_3$: 0.4-4%, and $MnO_2$: 0.1-2%.

The present invention further provides matrix glass.

The technical solution adopted by the present invention for solving the technical problem is as follows:

(79) Matrix glass, including the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%.

(80) The matrix glass according to (79) further includes the following components in percentage by weight: $K_2O$: 0-5%; and/or MgO: 0-2%; and/or ZnO: 0-2%; and/or $Na_2O$: 0-6%; and/or SrO: 0-5%; and/or BaO: 0-5%; and/or CaO: 0-5%; and/or $TiO_2$: 0-5%; and/or $B_2O_3$: 0-5%; and/or $Ln_2O_3$: 0-5%; and/or a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(81) The matrix glass includes the following components in percentage by weight: $SiO_2$: 45-70%; $Al_2O_3$: 8-18%; $Li_2O$: 10-25%; $ZrO_2$: 5-15%; $P_2O_5$: 2-10%; $Y_2O_3$: greater than 0 but less than or equal to 8%; $K_2O$: 0-5%; MgO: 0-2%; ZnO: 0-2%; $Na_2O$: 0-6%; SrO: 0-5%; BaO: 0-5%; CaO: 0-5%; $TiO_2$: 0-5%; $B_2O_3$: 0-5%; $Ln_2O_3$: 0-5%; and a clarifying agent: 0-2%, where $Ln_2O_3$ is one or more of La$_2$O$_3$, Gd$_2$O$_3$, and Yb$_2$O$_3$, and the clarifying agent is one or more of Sb$_2$O$_3$, SnO$_2$, SnO, CeO$_2$, F, Cl, and Br.

(82) The matrix glass according to any one of (79) to (81), where the components are expressed in percentage by weight, and the content of each component satisfies more than one of the following five situations:
1) Y$_2$O$_3$/ZrO$_2$ is greater than 0;
2) (Li$_2$O+ZrO$_2$+P$_2$O$_5$)/Y$_2$O$_3$ is 2.5-50.0;
3) Al$_2$O$_3$/(Li$_2$O+ZrO$_2$+P$_2$O$_5$) is 0.16-0.9;
4) Na$_2$O/Y$_2$O$_3$ is 6.0 or less; and
5) Y$_2$O$_3$/(Al$_2$O$_3$+SiO$_2$) is greater than 0 but less than or equal to 0.15.

(83) The matrix glass according to any one of (79) to (82) includes the following components in percentage by weight: SiO$_2$: 50-65%; and/or Al$_2$O$_3$: 8-15%; and/or Li$_2$O: 13-22%; and/or ZrO$_2$: 6-12%; and/or P$_2$O$_5$: 3.5-9%; and/or K$_2$O: 0-4%; and/or MgO: 0-1%; and/or ZnO: 0-1%; and/or Na$_2$O: 1-5%; and/or Y$_2$O$_3$: 1-7%; and/or SrO: 0-3%; and/or TiO$_2$: 0-3%; and/or BaO: 0-3%; and/or CaO: 0-3%; and/or B$_2$O$_3$: 0-3%; and/or Ln$_2$O$_3$: 0-4%; and/or a clarifying agent: 0-1%, where Ln$_2$O$_3$ is one or more of La$_2$O$_3$, Gd$_2$O$_3$, and Yb$_2$O$_3$, and the clarifying agent is one or more of Sb$_2$O$_3$, SnO$_2$, SnO, CeO$_2$, F, Cl, and Br.

(84) The matrix glass according to any one of (79) to (83), where the components are expressed in percentage by weight, and the content of each component satisfies more than one of the following five situations:
1) Y$_2$O$_3$/ZrO$_2$ is 0.1-1.0;
2) (Li$_2$O+ZrO$_2$+P$_2$O$_5$)/Y$_2$O$_3$ is 3.0-40.0;
3) Al$_2$O$_3$/(Li$_2$O+ZrO$_2$+P$_2$O$_5$) is 0.18-0.6;
4) Na$_2$O/Y$_2$O$_3$ is 0.1-5.0; and
5) Y$_2$O$_3$/(Al$_2$O$_3$+SiO$_2$) is 0.01-0.12.

(85) The matrix glass according to any one of (79) to (84) includes the following components in percentage by weight: SiO$_2$: 53-63%; and/or Al$_2$O$_3$: 8-12%; and/or Li$_2$O: 14-21%; and/or ZrO$_2$: 7-12%; and/or P$_2$O$_5$: 4-8%; and/or K$_2$O: 0-2%; and/or Y$_2$O$_3$: 2-6%; and/or B$_2$O$_3$: 0-2%; and/or Na$_2$O: 1.5-4%; and/or SrO: 0-1%; and/or TiO$_2$: 0-1%; and/or BaO: 0-1%; and/or CaO: 0-1%; and/or Ln$_2$O$_3$: 0-3%; and/or a clarifying agent: 0-0.5%, where Ln$_2$O$_3$ is one or more of La$_2$O$_3$, Gd$_2$O$_3$, and Yb$_2$O$_3$, and the clarifying agent is one or more of Sb$_2$O$_3$, SnO$_2$, SnO, CeO$_2$, F, Cl, and Br.

(86) The matrix glass according to any one of (79) to (85), where the components are expressed in percentage by weight, and the content of each component satisfies more than one of the following five situations:
1) Y$_2$O$_3$/ZrO$_2$ is 0.2-0.6;
2) (Li$_2$O+ZrO$_2$+P$_2$O$_5$)/Y$_2$O$_3$ is 4.0-21.0;
3) Al$_2$O$_3$/(Li$_2$O+ZrO$_2$+P$_2$O$_5$) is 0.19-0.5;
4) Na$_2$O/Y$_2$O$_3$ is 0.3-2.0; and
5) Y$_2$O$_3$/(Al$_2$O$_3$+SiO$_2$) is 0.03-0.09.

(87) The matrix glass according to any one of (79) to (86) excludes SrO; and/or excludes BaO; and/or excludes CaO; and/or excludes ZnO; and/or excludes PbO; and/or excludes As$_2$O$_3$; and/or excludes TiO$_2$; and/or excludes B$_2$O$_3$; and/or excludes Ln$_2$O$_3$; and/or excludes F; and/or excludes Ta$_2$O$_5$.

(88) The matrix glass according to any one of (79) to (87), where a coefficient of thermal expansion of the matrix glass is $50\times10^{-7}$/K-$70\times10^{-7}$/K.

(89) The matrix glass according to any one of (79) to (88), where a refractive index of the matrix glass is 1.5600-1.5700.

(90) The matrix glass according to any one of (79) to (80), where the matrix glass includes a colorant.

(91) The matrix glass according to (90), where the colorant includes the following components in percentage by weight: NiO: 0-4%; and/or Ni$_2$O$_3$: 0-4%; and/or CoO: 0-2%; and/or Co$_2$O$_3$: 0-2%; and/or Fe$_2$O$_3$: 0-7%; and/or MnO$_2$: 0-4%; and/or Er$_2$O$_3$: 0-8%; and/or Nd$_2$O$_3$: 0-8%; and/or Cu$_2$O: 0-4%; and/or Pr$_2$O$_3$: 0-8%; and/or CeO$_2$: 0-4%.

(92) The matrix glass according to either (90) or (91), where the colorant includes the following components in percentage by weight: NiO: 0.1-4%; and/or Ni$_2$O$_3$: 0.1-4%; and/or CoO: 0.05-2%; and/or Co$_2$O$_3$: 0.05-2%; and/or Fe$_2$O$_3$: 0.2-7%; and/or MnO$_2$: 0.1-4%; and/or Er$_2$O$_3$: 0.4-8%; and/or Nd$_2$O$_3$: 0.4-8%; and/or Cu$_2$O: 0.5-4%; and/or Pr$_2$O$_3$: 0.4-8%; and/or CeO$_2$: 0.5-4%.

(93) The matrix glass according to either (90) or (91), where the colorant includes the following components in percentage by weight: NiO: 0.1-3%; and/or Ni$_2$O$_3$: 0.1-3%; and/or CoO: 0.05-1.8%; and/or Co$_2$O$_3$: 0.05-1.8%; and/or Fe$_2$O$_3$: 0.2-5%; and/or MnO$_2$: 0.1-3%; and/or Er$_2$O$_3$: 0.4-6%; and/or Nd$_2$O$_3$: 0.4-6%; and/or Cu$_2$O: 0.5-3%; and/or Pr$_2$O$_3$: 0.4-6%; and/or CeO$_2$: 0.5-3%.

(94) The matrix glass according to either (90) or (91), where the colorant includes the following components in percentage by weight: NiO: 0.1-3%; and/or Ni$_2$O$_3$: 0.1-3%.

(95) The matrix glass according to either (90) or (91), where the colorant includes the following components in percentage by weight: CoO: 0.05-1.8%; and/or Co$_2$O$_3$: 0.05-1.8%.

(96) The matrix glass according to either (90) or (91), where the colorant includes the following components in percentage by weight: Cu$_2$O: 0.5-3%; and/or CeO$_2$: 0.5-3%.

(97) The matrix glass according to either (90) or (91), where the colorant includes the following components in percentage by weight: Fe$_2$O$_3$: 0.2-5%, and CoO: 0.05-0.3%; or Fe$_2$O$_3$: 0.2-5%, and Co$_2$O$_3$: 0.05-0.3%; or Fe$_2$O$_3$: 0.2-5%, CoO: 0.05-0.3%, and NiO: 0.1-1%; or Fe$_2$O$_3$: 0.2-5%, Co$_2$O$_3$: 0.05-0.3%, and NiO: 0.1-1%.

(98) The matrix glass according to either (90) or (91), where the colorant includes the following components in percentage by weight: Pr$_2$O$_3$: 0.4-6%; or Fe$_2$O$_3$: 0.2-5%; or MnO$_2$: 0.1-3%; or Er$_2$O$_3$: 0.4-6%; or Nd$_2$O$_3$: 0.4-6%.

(99) The matrix glass according to either (90) or (91), where the colorant includes the following components in percentage by weight: Er$_2$O$_3$: 0.4-6%, Nd$_2$O$_3$: 0.4-4%, and MnO$_2$: 0.1-2%.

The present invention further provides a glass cover plate.

(100) The glass cover plate includes the microcrystalline glass product according to any one of (1) to (40), and/or the microcrystalline glass according to any one of (41) to (78), and/or the matrix glass according to any one of (79) to (99).

The present invention further provides a glass component.

(101) The glass component includes the microcrystalline glass product according to any one of (1) to (40), and/or the microcrystalline glass according to any one of (41) to (78), and/or the matrix glass according to any one of (79) to (99).

The present invention further provides a display device.

(102) The display device includes the microcrystalline glass product according to any one of (1) to (40), and/or the microcrystalline glass according to any one of (41) to (78), and/or the matrix glass according to any one of (79) to (99), and/or the glass cover plate according to (100), and/or the glass component according to (101).

The present invention further provides an electronic device.

(103) The electronic device includes the microcrystalline glass product according to any one of (1) to (40), and/or the microcrystalline glass according to any one of (41) to (78), and/or the matrix glass according to any one of (79) to (99), and/or the glass cover plate according to (100), and/or the glass component according to (101).

The present invention further provides a method for manufacturing a microcrystalline glass product.

(104) The method for manufacturing a microcrystalline glass product includes the following steps:

forming matrix glass, the matrix glass including the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%; and forming the matrix glass into a microcrystalline glass through a crystallization process, and then forming the microcrystalline glass into a microcrystalline glass product through a chemical strengthening process.

(105) The method for manufacturing a microcrystalline glass product according to (104), where the matrix glass further includes the following components in percentage by weight: $K_2O$: 0-5%; and/or MgO: 0-2%; and/or ZnO: 0-2%; and/or $Na_2O$: 0-6%; and/or SrO: 0-5%; and/or $TiO_2$: 0-5%; and/or BaO: 0-5%; and/or CaO: 0-5%; and/or $B_2O_3$: 0-5%; and/or $Ln_2O_3$: 0-5%; and/or a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(106) The method for manufacturing a microcrystalline glass product includes the following steps:

forming matrix glass, the matrix glass including the following components in percentage by weight: $SiO_2$: 45-70%; $Al_2O_3$: 8-18%; $Li_2O$: 10-25%; $ZrO_2$: 5-15%; $P_2O_5$: 2-10%; $Y_2O_3$: greater than 0 but less than or equal to 8%; $K_2O$: 0-5%; MgO: 0-2%; ZnO: 0-2%; $Na_2O$: 0-6%; SrO: 0-5%; $TiO_2$: 0-5%; BaO: 0-5%; CaO: 0-5%; $B_2O_3$: 0-5%; $Ln_2O_3$: 0-5%; and a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br; and forming the matrix glass into a microcrystalline glass through a crystallization process, and then forming the microcrystalline glass into a microcrystalline glass product through a chemical strengthening process.

(107) The method for manufacturing a microcrystalline glass product according to any one of (104) to (106), where the components of the matrix glass are expressed in percentage by weight, and the content of each component satisfies more than one of the following five situations:

1) $Y_2O_3/ZrO_2$ is greater than 0;
2) $(Li_2O+ZrO_2+P_2O_5)/Y_2O_3$ is 2.5-50.0;
3) $Al_2O_3/(Li_2O+ZrO_2+P_2O_5)$ is 0.16-0.9;
4) $Na_2O/Y_2O_3$ is 6.0 or less; and
5) $Y_2O_3/(Al_2O_3+SiO_2)$ is greater than 0 but less than or equal to 0.15.

(108) The method for manufacturing a microcrystalline glass product according to any one of (104) to (107), where the matrix glass includes the following components in percentage by weight: $SiO_2$: 50-65%; and/or $Al_2O_3$: 8-15%; and/or $Li_2O$: 13-22%; and/or $ZrO_2$: 6-12%; and/or $P_2O_5$: 3.5-9%; and/or $K_2O$: 0-4%; and/or MgO: 0-1%; and/or ZnO: 0-1%; and/or $Na_2O$: 1-5%; and/or $Y_2O_3$: 1-7%; and/or SrO: 0-3%; and/or $TiO_2$: 0-3%; and/or BaO: 0-3%; and/or CaO: 0-3%; and/or $B_2O_3$: 0-3%; and/or $Ln_2O_3$: 0-4%; and/or a clarifying agent: 0-1%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(109) The method for manufacturing a microcrystalline glass product according to any one of (104) to (108), where the components of the matrix glass are expressed in percentage by weight, and the content of each component satisfies more than one of the following five situations:

1) $Y_2O_3/ZrO_2$ is 0.1-1.0;
2) $(Li_2O+ZrO_2+P_2O_5)/Y_2O_3$ is 3.0-40.0;
3) $Al_2O_3/(Li_2O+ZrO_2+P_2O_5)$ is 0.18-0.6;
4) $Na_2O/Y_2O_3$ is 0.1-5.0; and
5) $Y_2O_3/(Al_2O_3+SiO_2)$ is 0.01-0.12.

(110) The method for manufacturing a microcrystalline glass product according to any one of (104) to (109), where the matrix glass includes the following components in percentage by weight: $SiO_2$: 53-63%; and/or $Al_2O_3$: 8-12%; and/or $Li_2O$: 14-21%; and/or $ZrO_2$: 7-12%; and/or $P_2O_5$: 4-8%; and/or $K_2O$: 0-2%; and/or $Y_2O_3$: 2-6%; and/or $B_2O_3$: 0-2%; and/or $Na_2O$: 1.5-4%; and/or SrO: 0-1%; and/or $TiO_2$: 0-1%; and/or BaO: 0-1%; and/or CaO: 0-1%; and/or $Ln_2O_3$: 0-3%; and/or a clarifying agent: 0-0.5%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(111) The method for manufacturing a microcrystalline glass product according to any one of (104) to (110), where the components of the matrix glass are expressed in percentage by weight, and the content of each component satisfies more than one of the following five situations:

1) $Y_2O_3/ZrO_2$ is 0.2-0.6;
2) $(Li_2O+ZrO_2+P_2O_5)/Y_2O_3$ is 4.0-21.0;
3) $Al_2O_3/(Li_2O+ZrO_2+P_2O_5)$ is 0.19-0.5;
4) $Na_2O/Y_2O_3$ is 0.3-2.0; and
5) $Y_2O_3/(Al_2O_3+SiO_2)$ is 0.03-0.09.

(112) The method for manufacturing a microcrystalline glass product according to any one of (104) to (111), where the matrix glass excludes SrO; and/or excludes BaO; and/or excludes CaO; and/or excludes ZnO; and/or excludes PbO; and/or excludes $As_2O_3$; and/or excludes $TiO_2$; and/or excludes $B_2O_3$; and/or excludes $Ln_2O_3$; and/or excludes F; and/or excludes $Ta_2O_5$.

(113) The method for manufacturing a microcrystalline glass product according to either (104) or (105), where the matrix glass includes a colorant.

(114) The method for manufacturing a microcrystalline glass product according to (113), where the colorant includes the following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

(115) The method for manufacturing a microcrystalline glass product according to either (113) or (114), where the colorant includes the following components in percentage by weight: NiO: 0.1-4%; and/or $Ni_2O_3$: 0.1-4%; and/or CoO: 0.05-2%; and/or $Co_2O_3$: 0.05-2%; and/or $Fe_2O_3$: 0.2-7%; and/or $MnO_2$: 0.1-4%; and/or $Er_2O_3$: 0.4-8%; and/or $Nd_2O_3$: 0.4-8%; and/or $Cu_2O$: 0.5-4%; and/or $Pr_2O_3$: 0.4-8%; and/or $CeO_2$: 0.5-4%.

(116) The method for manufacturing a microcrystalline glass product according to either (113) or (114), where the colorant includes the following components in percentage by weight: NiO: 0.1-3%; and/or $Ni_2O_3$: 0.1-3%; and/or CoO: 0.05-1.8%; and/or $Co_2O_3$: 0.05-1.8%; and/or $Fe_2O_3$: 0.2-5%; and/or $MnO_2$: 0.1-3%; and/or $Er_2O_3$: 0.4-6%; and/or $Nd_2O_3$: 0.4-6%; and/or $Cu_2O$: 0.5-3%; and/or $Pr_2O_3$: 0.4-6%; and/or $CeO_2$: 0.5-3%.

(117) The method for manufacturing a microcrystalline glass product according to either (113) or (114), where the colorant includes the following components in percentage by weight: NiO: 0.1-3%; and/or $Ni_2O_3$: 0.1-3%.

(118) The method for manufacturing a microcrystalline glass product according to either (113) or (114), where the colorant includes the following components in percentage by weight: CoO: 0.05-1.8%; and/or $Co_2O_3$: 0.05-1.8%.

(119) The method for manufacturing a microcrystalline glass product according to either (113) or (114), where the colorant includes the following components in percentage by weight: $Cu_2O$: 0.5-3%; and/or $CeO_2$: 0.5-3%.

(120) The method for manufacturing a microcrystalline glass product according to either (113) or (114), where the colorant includes the following components in percentage by weight: $Fe_2O_3$: 0.2-5%, and CoO: 0.05-0.3%; or $Fe_2O_3$: 0.2-5%, and $Co_2O_3$: 0.05-0.3%; or $Fe_2O_3$: 0.2-5%, CoO: 0.05-0.3%, and NiO: 0.1-1%; or $Fe_2O_3$: 0.2-5%, $Co_2O_3$: 0.05-0.3%, and NiO: 0.1-1%.

(121) The method for manufacturing a microcrystalline glass product according to either (113) or (114), where the colorant includes the following components in percentage by weight: $Pr_2O_3$: 0.4-6%; or $Fe_2O_3$: 0.2-5%; or $MnO_2$: 0.1-3%; or $Er_2O_3$: 0.4-6%; or $Nd_2O_3$: 0.4-6%.

(122) The method for manufacturing a microcrystalline glass product according to either (113) or (114), where the colorant includes the following components in percentage by weight: $Er_2O_3$: 0.4-6%, $Nd_2O_3$: 0.4-4%, and $MnO_2$: 0.1-2%.

(123) The method for manufacturing a microcrystalline glass product according to any one of (104) to (122), where the crystallization process includes the following steps: increasing a temperature to a prescribed crystallization treatment temperature; after reaching the crystallization treatment temperature, maintaining the temperature for a certain period of time; and then cooling down. The crystallization treatment temperature is 600° C. to 750° C., and preferably 650° C. to 700° C. The holding time at the crystallization treatment temperature is 0-8 hours, and preferably 1-6 hours.

(124) The method for manufacturing a microcrystalline glass product according to any one of (104) to (122), where the crystallization process includes the following steps: performing a nucleation process at a first temperature, and then performing a crystal growth process at a second temperature higher than the nucleation process temperature.

(125) The method for manufacturing a microcrystalline glass product according to (124), where the crystallization process includes the following steps: the first temperature is 470-630° C., the second temperature is 650-750° C., the holding time at the first temperature is 0-24 hours, and preferably 2-15 hours, and the holding time at the second temperature is 0-10 hours, and preferably 0.5-6 hours.

(126) The method for manufacturing a microcrystalline glass product according to any one of (104) to (125), where the chemical strengthening process includes: immersing the microcrystalline glass in a salt bath of molten Na salt at a temperature of 430° C. to 470° C. for 6-20 hours, a preferred temperature range being 435° C. to 460° C., and a preferred time range being 8-13 hours; and/or immersing the microcrystalline glass in a salt bath of molten K salt at the temperature of 400° C. to 450° C. for 1-8 hours, a preferred time range being 2-4 hours.

(127) The method for manufacturing a microcrystalline glass product according to any one of (104) to (126), where a crystal phase of the microcrystalline glass product includes lithium monosilicate and/or lithium phosphate.

(128) The method for manufacturing a microcrystalline glass product according to any one of (104) to (127), where the crystal phase of the microcrystalline glass product mainly includes lithium monosilicate, the lithium monosilicate has a higher weight percentage than other crystal phases, and the lithium monosilicate accounts for 10-63.5% of the microcrystalline glass product, and preferably 15-55%.

(129) The method for manufacturing a microcrystalline glass product according to any one of (104) to (128), where the microcrystalline glass product includes a lithium phosphate crystal phase, and the lithium phosphate crystal phase accounts for 3-15% of the microcrystalline glass product, and preferably 5-12%.

(130) The method for manufacturing a microcrystalline glass product according to any one of (104) to (112), where a surface stress of the microcrystalline glass product is 600 MPa or more, preferably 650 MPa or more, and more preferably 700 MPa or more.

(131) The method for manufacturing a microcrystalline glass product according to any one of (104) to (112), where a four-point bending strength of the microcrystalline glass product is 600 MPa or more, preferably 650 MPa or more, and more preferably 700 MPa or more.

(132) The method for manufacturing a microcrystalline glass product according to any one of (104) to (112), where an ion-exchange layer depth of the microcrystalline glass product is 20 μm or more, preferably 30 ∞m or more, and more preferably 40 μm or more.

(133) The method for manufacturing a microcrystalline glass product according to any one of (104) to (112), where a drop ball test height of the microcrystalline glass product is 1300 mm or more, preferably 1400 mm or more, and more preferably 1500 mm or more.

(134) The method for manufacturing a microcrystalline glass product according to any one of (104) to (112), where fracture toughness of the microcrystalline glass product is 1 MPa·m$^{1/2}$ or more, preferably 1.1 Mpa·m$^{1/2}$ or more, and more preferably 1.2 Mpa·m$^{1/2}$ or more.

(135) The method for manufacturing a microcrystalline glass product according to any one of (104) to (112), where Vickers hardness of the microcrystalline glass product is 700 kgf/mm$^2$ or more, preferably 720 kgf/mm$^2$ or more, and more preferably 730 kgf/mm$^2$ or more.

(136) The method for manufacturing a microcrystalline glass product according to any one of (104) to (112), where a crystallinity of the microcrystalline glass product is 50% or more, preferably 60% or more, and more preferably 70% or more.

(137) The method for manufacturing a microcrystalline glass product according to any one of (104) to (112), where a grain size of the microcrystalline glass product is 50 nm or less, preferably 40 nm or less, and more preferably 30 nm or less.

(138) The method for manufacturing a microcrystalline glass product according to any one of (104) to (112), where a haze of the microcrystalline glass product with a thickness of 1 mm or less is 0.15% or less, preferably 0.12% or less, and more preferably 0.1% or less.

(139) The method for manufacturing a microcrystalline glass product according to any one of (104) to (112), where average transmittance of the microcrystalline glass product with the thickness of 1 mm or less at a wavelength of 400-800 nm is 89% or more.

(140) The method for manufacturing a microcrystalline glass product according to any one of (104) to (112), where transmittance of the microcrystalline glass product with the thickness of 1 mm or less at the wavelength of 550 nm is 91% or more.

(141) The method for manufacturing a microcrystalline glass product according to any one of (104) to (112), where an average light |B| value of the microcrystalline glass product with the thickness of 1 mm or less at 400-800 nm is 0.6 or less, preferably 0.55 or less, and more preferably 0.5 or less.

(142) The method for manufacturing a microcrystalline glass product according to any one of (138) to (141), where the thickness of the microcrystalline glass product is 0.2-1 mm, preferably 0.3-0.9 mm, more preferably 0.5-0.8 mm, further preferably 0.55 mm or 0.6 mm or 0.68 mm or 0.72 mm or 0.75 mm.

The present invention further provides a method for manufacturing a microcrystalline glass.

(143) The method for manufacturing microcrystalline glass includes the following steps:

forming matrix glass, the matrix glass including the following components in percentage by weight: $SiO_2$: 45-70%; $Al_2O_3$: 8-18%; $Li_2O$: 10-25%; $ZrO_2$: 5-15%; $P_2O_5$: 2-10%; and $Y_2O_3$: greater than 0 but less than or equal to 8%; and forming the matrix glass into a microcrystalline glass through a crystallization process.

(144) The method for manufacturing a microcrystalline glass according to (143), where the matrix glass further includes the following components in percentage by weight: $K_2O$: 0-5%; and/or MgO: 0-2%; and/or ZnO: 0-2%; and/or $Na_2O$: 0-6%; and/or SrO: 0-5%; and/or $TiO_2$: 0-5%; and/or BaO: 0-5%; and/or CaO: 0-5%; and/or $B_2O_3$: 0-5%; and/or $Ln_2O_3$: 0-5%; and/or a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(145) The method for manufacturing a microcrystalline glass includes the following steps:

forming matrix glass, the matrix glass including the following components in percentage by weight: $SiO_2$: 45-70%; $Al_2O_3$: 8-18%; $Li_2O$: 10-25%; $ZrO_2$: 5-15%; $P_2O_5$: 2-10%; $Y_2O_3$: greater than 0 but less than or equal to 8%; $K_2O$: 0-5%; MgO: 0-2%; ZnO: 0-2%; $Na_2O$: 0-6%; SrO: 0-5%; $TiO_2$: 0-5%; BaO: 0-5%; CaO: 0-5%; $B_2O_3$: 0-5%; $Ln_2O_3$: 0-5%; and a clarifying agent: 0-2%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br; and forming the matrix glass to a microcrystalline glass through a crystallization process.

(146) The method for manufacturing a microcrystalline glass according to any one of (143) to (145), where the components of the matrix glass are expressed in percentage by weight, and the content of each component satisfies more than one of the following five situations:
 1) $Y_2O_3/ZrO_2$ is greater than 0;
 2) $(Li_2O+ZrO_2+P_2O_5)/Y_2O_3$ is 2.5-50.0;
 3) $Al_2O_3/(Li_2O+ZrO_2+P_2O_5)$ is 0.16-0.9;
 4) $Na_2O/Y_2O_3$ is 6.0 or less; and
 5) $Y_2O_3/(Al_2O_3+SiO_2)$ is greater than 0 but less than or equal to 0.15.

(147) The method for manufacturing a microcrystalline glass according to any one of (143) to (146), where the matrix glass includes the following components in percentage by weight: $SiO_2$: 50-65%; and/or $Al_2O_3$: 8-15%; and/or $Li_2O$: 13-22%; and/or $ZrO_2$: 6-12%; and/or $P_2O_5$: 3.5-9%; and/or $K_2O$: 0-4%; and/or MgO: 0-1%; and/or ZnO: 0-1%; and/or $Na_2O$: 1-5%; and/or $Y_2O_3$: 1-7%; and/or SrO: 0-3%; and/or $TiO_2$: 0-3%; and/or BaO: 0-3%; and/or CaO: 0-3%; and/or $B_2O_3$: 0-3%; and/or $Ln_2O_3$: 0-4%; and/or a clarifying agent: 0-1%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(148) The method for manufacturing a microcrystalline glass according to any one of (143) to (147), where the components of the matrix glass are expressed in percentage by weight, and the content of each component satisfies more than one of the following five situations:
 1) $Y_2O_3/ZrO_2$ is 0.1-1.0;
 2) $(Li_2O+ZrO_2+P_2O_5)/Y_2O_3$ is 3.0-40.0;
 3) $Al_2O_3/(Li_2O+ZrO_2+P_2O_5)$ is 0.18-0.6;
 4) $Na_2O/Y_2O_3$ is 0.1-5.0; and
 5) $Y_2O_3/(Al_2O_3+SiO_2)$ is 0.01-0.12.

(149) The method for manufacturing a microcrystalline glass according to any one of (143) to (148), where the matrix glass includes the following components in percentage by weight: $SiO_2$: 53-63%; and/or $Al_2O_3$: 8-12%; and/or $Li_2O$: 14-21%; and/or $ZrO_2$: 7-12%; and/or $P_2O_5$: 4-8%; and/or $K_2O$: 0-2%; and/or $Y_2O_3$: 2-6%; and/or $B_2O_3$: 0-2%; and/or $Na_2O$: 1.5-4%; and/or SrO: 0-1%; and/or $TiO_2$: 0-1%; and/or BaO: 0-1%; and/or CaO: 0-1%; and/or $Ln_2O_3$: 0-3%; and/or a clarifying agent: 0-0.5%, where $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

(150) The method for manufacturing a microcrystalline glass according to any one of (143) to (149), where the components of the matrix glass are expressed in percentage by weight, and the content of each component satisfies more than one of the following five situations:
 1) $Y_2O_3/ZrO_2$ is 0.2-0.6;
 2) $(Li_2O+ZrO_2+P_2O_5)/Y_2O_3$ is 4.0-21.0;
 3) $Al_2O_3/(Li_2O+ZrO_2+P_2O_5)$ is 0.19-0.5;
 4) $Na_2O/Y_2O_3$ is 0.3-2.0; and
 5) $Y_2O_3/(Al_2O_3+SiO_2)$ is 0.03-0.09.

(151) The method for manufacturing a microcrystalline glass according to any one of (143) to (150), where the matrix glass excludes SrO; and/or excludes BaO; and/or excludes CaO; and/or excludes ZnO; and/or excludes PbO; and/or excludes $As_2O_3$; and/or excludes $TiO_2$; and/or excludes $B_2O_3$; and/or excludes $Ln_2O_3$; and/or excludes F; and/or excludes $Ta_2O_5$.

(152) The method for manufacturing a microcrystalline glass according to either (143) or (144), where the matrix glass includes a colorant.

(153) The method for manufacturing a microcrystalline glass according to (152), where the colorant includes the following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

(154) The method for manufacturing a microcrystalline glass according to either (152) or (153), where the colorant includes the following components in percentage by weight: NiO: 0.1-4%; and/or $Ni_2O_3$: 0.1-4%; and/or CoO: 0.05-2%; and/or $Co_2O_3$: 0.05-2%; and/or $Fe_2O_3$: 0.2-7%; and/or $MnO_2$: 0.1-4%; and/or $Er_2O_3$: 0.4-8%; and/or $Nd_2O_3$: 0.4-8%; and/or $Cu_2O$: 0.5-4%; and/or $Pr_2O_3$: 0.4-8%; and/or $CeO_2$: 0.5-4%.

(155) The method for manufacturing a microcrystalline glass according to either (152) or (153), where the colorant includes the following components in percentage by weight: NiO: 0.1-3%; and/or $Ni_2O_3$: 0.1-3%; and/or CoO: 0.05-1.8%; and/or $Co_2O_3$: 0.05-1.8%; and/or $Fe_2O_3$: 0.2-5%; and/or $MnO_2$: 0.1-3%; and/or $Er_2O_3$: 0.4-6%; and/or $Nd_2O_3$: 0.4-6%; and/or $Cu_2O$: 0.5-3%; and/or $Pr_2O_3$: 0.4-6%; and/or $CeO_2$: 0.5-3%.

(156) The method for manufacturing a microcrystalline glass according to either (152) or (153), where the colorant includes the following components in percentage by weight: NiO: 0.1-3%; and/or $Ni_2O_3$: 0.1-3%.

(157) The method for manufacturing a microcrystalline glass according to either (152) or (153), where the colorant includes the following components in percentage by weight: CoO: 0.05-1.8%; and/or $Co_2O_3$: 0.05-1.8%.

(158) The method for manufacturing a microcrystalline glass according to either (152) or (153), where the colorant includes the following components in percentage by weight: $Cu_2O$: 0.5-3%; and/or $CeO_2$: 0.5-3%.

(159) The method for manufacturing a microcrystalline glass according to either (152) or (153), where the colorant includes the following components in percentage by weight: $Fe_2O_3$: 0.2-5%, and CoO: 0.05-0.3%; or $Fe_2O_3$: 0.2-5%, and $Co_2O_3$: 0.05-0.3%; or $Fe_2O_3$: 0.2-5%, CoO: 0.05-0.3%, and NiO: 0.1-1%; or $Fe_2O_3$: 0.2-5%, $Co_2O_3$: 0.05-0.3%, and NiO: 0.1-1%.

(160) The method for manufacturing a microcrystalline glass according to either (152) or (153), where the colorant includes the following components in percentage by weight: $Pr_2O_3$: 0.4-6%; or $Fe_2O_3$: 0.2-5%; or $MnO_2$: 0.1-3%; or $Er_2O_3$: 0.4-6%; or $Nd_2O_3$: 0.4-6%.

(161) The method for manufacturing a microcrystalline glass according to either (152) or (153), where the colorant includes the following components in percentage by weight: $Er_2O_3$: 0.4-6%, $Nd_2O_3$: 0.4-4%, and $MnO_2$: 0.1-2%.

(162) The method for manufacturing a microcrystalline glass according to any one of (143) to (161), where the crystallization process includes the following steps: increasing a temperature to a prescribed crystallization treatment temperature; after reaching the crystallization treatment temperature, maintaining the temperature for a certain period of time; and then cooling down. The crystallization treatment temperature is 600° C. to 750° C., and preferably 650° C. to 700° C. The holding time at the crystallization treatment temperature is 0-8 hours, and preferably 1-6 hours.

(163) The method for manufacturing a microcrystalline glass according to any one of (143) to (161), where the crystallization process includes the following steps: performing a nucleation process at a first temperature, and then performing a crystal growth process at a second temperature higher than the nucleation process temperature.

(164) The method for manufacturing a microcrystalline glass according to (163), where the crystallization process includes the following steps: the first temperature is 470-630° C., the second temperature is 650-750° C., the holding time at the first temperature is 0-24 hours, and preferably 2-15 hours, and the holding time at the second temperature is 0-10 hours, and preferably 0.5-6 hours.

(165) The method for manufacturing a microcrystalline glass according to any one of (143) to (164), where a crystal phase of the microcrystalline glass includes lithium monosilicate and/or lithium phosphate.

(166) The method for manufacturing a microcrystalline glass according to any one of (143) to (165), where the crystal phase of the microcrystalline glass mainly includes lithium monosilicate, the lithium monosilicate has a higher weight percentage than other crystal phases, and the lithium monosilicate accounts for 10-63.5% of the microcrystalline glass, and preferably 15-55%.

(167) The method for manufacturing a microcrystalline glass according to any one of (143) to (166), where the microcrystalline glass includes a lithium phosphate crystal phase, and the lithium phosphate crystal phase accounts for 3-15% of the microcrystalline glass, and preferably 5-12%.

(168) The method for manufacturing a microcrystalline glass according to any one of (143) to (151), where a crystallinity of the microcrystalline glass is 50% or more, preferably 60% or more, and more preferably 70% or more.

(169) The method for manufacturing a microcrystalline glass according to any one of (143) to (151), where a grain size of the microcrystalline glass is 50 nm or less, preferably 40 nm or less, and more preferably 30 nm or less; and/or a coefficient of thermal expansion is $75-95 \times 10^{-7}$/K.

(170) The method for manufacturing a microcrystalline glass according to any one of (143) to (151), where a refractive index of the microcrystalline glass is 1.5700-1.5800.

(171) The method for manufacturing a microcrystalline glass according to any one of (143) to (151), where a body drop height of the microcrystalline glass is 1000 mm or more, preferably 1100 mm or more, and more preferably 1200 mm or more.

(172) The method for manufacturing a microcrystalline glass according to any one of (143) to (151), where Vickers hardness of the microcrystalline glass is 650 $kgf/mm^2$ or more, preferably 680 $kgf/mm^2$ or more, and more preferably 700 $kgf/mm^2$ or more.

(173) The method for manufacturing a microcrystalline glass according to any one of (143) to (151), where a haze of the microcrystalline glass with a thickness of 1 mm or less is 0.15% or less, preferably 0.12% or less, and more preferably 0.1% or less.

(174) The method for manufacturing a microcrystalline glass according to any one of (143) to (151), where average transmittance of the microcrystalline glass with the thickness of 1 mm or less at a wavelength of 400-800 nm is 89% or more.

(175) The method for manufacturing a microcrystalline glass according to any one of (143) to (151), where transmittance of the microcrystalline glass with the thickness of 1 mm or less at the wavelength of 550 nm is 91% or more.

(176) The method for manufacturing a microcrystalline glass according to any one of (143) to (151), where an average light |B| value of the microcrystalline glass with the thickness of 1 mm or less at 400-800 nm is 0.6 or less, preferably 0.55 or less, and more preferably 0.5 or less.

(177) The method for manufacturing a microcrystalline glass according to any one of (173) to (176), where the thickness of the microcrystalline glass is 0.2-1 mm, preferably 0.3-0.9 mm, more preferably 0.5-0.8 mm, further preferably 0.55 mm or 0.6 mm or 0.68 mm or 0.72 mm or 0.75 mm.

The present invention has the following beneficial effects: through reasonable component design, the microcrystalline glass and the microcrystalline glass product obtained in the present invention have excellent mechanical and optical properties and are suitable for electronic devices or display devices.

DETAILED DESCRIPTION

The microcrystalline glass and the microcrystalline glass product of the present invention are materials with a crystal phase and a glass phase, which are different from amorphous solids. The crystal phases of the microcrystalline glass and the microcrystalline glass product can be distinguished by peak angles appearing in an X-ray diffraction pattern of X-ray diffraction analysis and/or measured by TEMEDX.

After repeated tests and studies, the inventor of the present invention obtains the microcrystalline glass or the microcrystalline glass product of the present invention at a lower cost by specifying the content and content ratios of specific components constituting the microcrystalline glass or the microcrystalline glass product to specific values and allowing the specific components to precipitate specific crystal phases.

The range of each component (ingredient) of the matrix glass, the microcrystalline glass, and the microcrystalline glass product of the present invention are described below. In the description, if there is no special illustration, the content of each component is expressed in percentage by weight (wt %) relative to the total amount of the matrix glass, or the microcrystalline glass, or the microcrystalline glass product of an oxide-converted composition. Here, the "oxide-converted composition" means that the oxides, composite salts, hydroxides, etc. used as raw materials for the constituent components of the matrix glass, the microcrystalline glass or the microcrystalline glass of the present invention are decomposed and converted into oxides when melted, the total amount of the oxide material is regarded as 100%. In addition, when only referred to as glass in the description, it is the matrix glass before crystallization, the matrix glass is called a microcrystalline glass after crystallization, and the microcrystalline glass product refers to a chemically strengthened microcrystalline glass.

Unless otherwise indicated under specific circumstances, the numerical ranges listed herein include upper and lower limits, and "or more" and "or less" include endpoint values, as well as all integers and fractions within the ranges, and are not limited to the specific values listed in the limited ranges. As used herein, the term "about" means that the formula, parameters, and other quantities and features are not, and need not be, accurate, and can be approximated and/or larger or lower if necessary, which reflects tolerances, conversion factors, measurement errors, etc. As used herein, "and/or" is inclusive, for example, "A; and/or B" means that there is only A, or only B, or both A and B.

In the microcrystalline glass and the microcrystalline glass product in the present invention, a crystal phase includes lithium monosilicate and/or lithium phosphate.

In some embodiments of the present invention, the crystal phase of the microcrystalline glass or the microcrystalline glass product mainly includes a lithium monosilicate crystal phase, the lithium monosilicate crystal phase has a higher weight percentage than other crystal phases, and the lithium monosilicate accounts for 10-63.5% of the microcrystalline glass or the microcrystalline glass product, and in some embodiments, the weight percentage range is 15-55%.

In some embodiments of the present invention, the crystal phase of the microcrystalline glass or the microcrystalline glass product includes a lithium phosphate crystal phase, and the weight percentage range of the crystal phase in the microcrystalline glass or the microcrystalline glass product is 3-15%, and in some embodiments, the weight percentage range is 5-12%.

$SiO_2$ is an essential component of the glass of the present invention. It is one of the main components forming crystals after thermal treatment. If the content of $SiO_2$ is 45% or less, it is more difficult to form crystals in the glass. Therefore, the lower limit of the content of $SiO_2$ is 45%, preferably 50%, and further preferably 53%. If the content of $SiO_2$ is 70% or more, it is unfavorable for glass formation and affects the haze and |B| value of the microcrystalline glass and the microcrystalline glass product. Therefore, the upper limit of the content of $SiO_2$ is 70%, preferably 65%, and more preferably 63%. In some embodiments, about 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70% of $SiO_2$ may be included.

$Al_2O_3$ can be used as a glass network structure, which is conducive to glass formation, reduces the glass crystallization temperature, and is conducive to glass crystallization. $Al_2O_3$ is one of the components forming microcrystalline glass crystals, which is conducive to chemical strengthening of the microcrystalline glass and increases the ion-exchange layer depth of the microcrystalline glass product, but if its content is less than 8%, the effect above is poor. Therefore, the lower limit of the content of $Al_2O_3$ is 8%. On the other hand, if the content of $Al_2O_3$ exceeds 18%, it affects the size of fragments after the chemical strengthening of the microcrystalline glass. Therefore, the upper limit of the content of $Al_2O_3$ is 18%, preferably 15%, and more preferably 12%. In some embodiments, about 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18% of $Al_2O_3$ may be included.

$Li_2O$ can promote the melting of glass and reduce the melting temperature. It is a main component for forming crystals, and is also the main component that replaces sodium and potassium ions in the chemical strengthening process, which can increase the surface stress of the chemically strengthened microcrystalline glass product and improve the drop ball height of the microcrystalline glass product. However, if the content of $Li_2O$ is less than 10%, the crystal phase of the formed lithium monosilicate is poor, which affects the drop height and fragment size of the microcrystalline glass product. Therefore, the lower limit of the content of $Li_2O$ is 10%, preferably 13%, and further preferably 14%. On the other hand, if there is too much $Li_2O$, the glass is prone to phase separation during crystallization, which affects the transmittance of the microcrystalline glass and the microcrystalline glass product. Therefore, the upper limit of the content of $Li_2O$ is 25%, preferably 22%, and further preferably 21%. In some embodiments, about 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25% $Li_2O$ may be included.

$Na_2O$ is an optional component, which can reduce the melting temperature of the glass and is conducive to the adjustment of the chemical strengthening process of the glass or microcrystalline glass. Therefore, the lower limit of the content of $Na_2O$ in the present invention is preferably 1%, and more preferably 1.5%. On the other hand, if the glass contains too much $Na_2O$, it promotes the phase separation of the glass, resulting in a decrease in the transmittance of the microcrystalline glass and the microcrystalline glass product after crystallization. Therefore, the upper limit of the content of $Na_2O$ is 6%, preferably 5%, and further preferably 4%. In some embodiments, about 0%, greater than 0%, 0.1%, 0.5%, 1%, 1.5%, 2%, 2.5%, 3%, 3.5%, 4%, 4.5%, 5%, 5.5%, and 6% of $Na_2O$ may be included.

$K_2O$ is conducive to glass formation and reduces the viscosity of the glass, but if the glass contains too much $K_2O$, it may easily lead to a decrease in the chemical stability and hardness of the glass. Therefore, the upper limit of the content of $K_2O$ is 5%, preferably 4%, and further preferably 2%. In some embodiments, about 0%, greater than 0%, 0.1%, 0.5%, 1%, 1.5%, 2.0%, 2.5%, 3.0%, 3.5%, 4.0%, 4.5%, and 5.0% of $K_2O$ may be included.

$P_2O_5$ can form a crystal nucleus in the glass crystallization process, promote the formation of crystals, and increase the crystallinity of the microcrystalline glass or the microcrystalline glass product, and is conducive to chemical strengthening, increasing the hardness, drop ball height and bending strength of the microcrystalline glass product. The lower limit of the content of $P_2O_5$ is 2%, preferably 3.5%, and more preferably 4%. However, if there is too much $P_2O_5$, it may easily lead to phase separation of the glass and reduce the chemical stability of the glass. Therefore, the upper limit of the content of $P_2O_5$ is 10%, preferably 9%, and further preferably 8%. In some embodiments, about 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, and 10% of $P_2O_5$ may be included.

$ZrO_2$ and $P_2O_5$ can dissolve each other, reduce the phase separation of $P_2O_5$ during glass formation, increase the crystallization temperature of the glass during crystallization, ensure the integrity of the lithium monosilicate crystal phase in the microcrystalline glass and the microcrystalline glass product, and reduce the haze and the |B| value of the microcrystalline glass and the microcrystalline glass product, and improve the drop resistance of the microcrystalline glass product. Therefore, the lower limit of the content of $ZrO_2$ is 5%, preferably 6%, and more preferably 7%. On the other hand, if there is too much $ZrO_2$, glass melting is difficult. Therefore, the upper limit of the content of $ZrO_2$ is 15%, and preferably 12%. In some embodiments, about 5.0%, 5.5%, 6.0%, 6.5%, 7.0%, 7.5%, 8.0%, 8.5%, 9.0%, 9.5%, 10.0%, 10.5%, 11.0%, 11.5%, 12%, 12.5%, 13.0%, 13.5%, 14.0%, 14.5%, and 15.0% of $ZrO_2$ may be included.

$Y_2O_3$ can promote the melting of $ZrO_2$, reduce the smelting difficulty of glass, reduce the phase separation in the glass, reduce the haze and |B| value of the microcrystalline glass and the microcrystalline glass product. The lower limit of the content of $Y_2O_3$ is greater than 0%, preferably 1%, and further preferably 2%. On the other hand, if the content of $Y_2O_3$ is too large, it is difficult to form crystals during glass crystallization, and the crystallinity of the microcrystalline glass and the microcrystalline glass product decreases. Therefore, the upper limit of the content of $Y_2O_3$ is 8%, preferably 7%, and further preferably 6%. In some embodiments, about greater than 0%, 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, and 8.0% of $Y_2O_3$ may be included.

After a large number of experimental studies of the inventor, it is found that in some embodiments, the relative content of $Y_2O_3$ and $ZrO_2$ has an important influence on the haze and |B| value of the microcrystalline glass and the microcrystalline glass product, especially making $Y_2O_3/ZrO_2$ greater than 0, which can reduce the haze and |B| value of the microcrystalline glass and the microcrystalline glass product, and improve the video photography and still photography effects of terminal products. Therefore, preferably, $Y_2O_3/ZrO_2$ is greater than 0, more preferably, $Y_2O_3/ZrO_2$ is 0.1-1.0, and further preferably, $Y_2O_3/ZrO_2$ is 0.2-0.6. In some embodiments, the value of $Y_2O_3/ZrO_2$ may be greater than 0, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, and 1.0.

In some embodiments of the present invention, making $(Li_2O+ZrO_2+P_2O_5)/Y_2O_3$ in the range of 2.5-50.0 can make grains of the matrix glass refined during the crystallization process, so that the microcrystalline glass and the microcrystalline glass product can obtain smaller grains, reducing the haze of the microcrystalline glass and the microcrystalline glass product. Therefore, preferably, $(Li_2O+ZrO_2+P_2O_5)/Y_2O_3$ is 2.5-50.0, more preferably, $(Li_2O+ZrO_2+P_2O_5)/Y_2O_3$ is 3.0-40.0, and further preferably $(Li_2O+ZrO_2+P_2O_5)/Y_2O_3$ is 4.0-21.0. In some embodiments, the value of $(Li_2O+ZrO_2+P_2O_5)/Y_2O_3$ may be 2.5, 3.0, 4.0, 5.0, 6.0, 7.0, 8.0, 9.0, 10.0, 11.0, 12.0, 13.0, 14.0, 15.0, 16.0, 17.0, 18.0, 19.0, 20.0, 21.0, 22.0, 23.0, 24.0, 25.0, 26.0, 27.0, 28.0, 29.0, 30.0, 31.0, 32.0, 33.0, 34.0, 35.0, 36.0, 37.0, 38.0, 39.0, 40.0, 41.0, 42.0, 43.0, 44.0, 45.0, 46.0, 47.0, 48.0, 49.0, and 50.0.

In the process of a large number of experimental studies, the inventor found that by controlling a ratio $Al_2O_3/(Li_2O+ZrO_2+P_2O_5)$ of $Al_2O_3$ to the total content $Li_2O+ZrO_2+P_2O_5$ of $P_2O_5$, $Li_2O$, and $ZrO_2$ is within the range of 0.16 to 0.9, the microcrystalline glass product can withstand the ball impact of 1300 mm or more, and more preferably, $Al_2O_3/(Li_2O+ZrO_2+P_2O_5)$ is 0.18-0.6. Furthermore, in some embodiments, further preferably, when $Al_2O_3/(Li_2O+ZrO_2+P_2O_5)$ is within the range of 0.19 to 0.5, it is easier to form the lithium monosilicate crystal phase, and the microcrystalline glass product is easier to obtain excellent fracture toughness. The fracture toughness may be 1 $MPa \cdot m^{1/2}$ or more, preferably 1.1 $MPa \cdot m^{1/2}$ or more, and more preferably 1.2 $MPa \cdot m^{1/2}$ or more. Moreover, the bearing capacity of the drop ball test height is further optimized. Therefore, further preferably, $Al_2O_3/(Li_2O+ZrO_2+P_2O_5)$ is 0.19-0.5. In some embodiments, $Al_2O_3/(Li_2O+ZrO_2+P_2O_5)$ may be 0.16, 0.17, 0.18, 0.19, 0.2, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.55, 0.60, 0.65, 0.70, 0.75, 0.80, 0.85, and 0.90.

After a large number of experimental studies by the inventor, it is found that the relative content of $Na_2O$ and $Y_2O_3$ has an important impact on the surface stress and the ion-exchange layer depth of the microcrystalline glass product, especially when $Na_2O/Y_2O_3$ is 6.0 or less, the surface stress and the ion-exchange layer depth of the microcrystalline glass product may be improved, and more preferably, $Na_2O/Y_2O_3$ is 0.1-5.0. In some embodiments, further preferably, $Na_2O/Y_2O_3$ is 0.3-2.0, which can also improve the fragment size of the microcrystalline glass product. In some embodiments, the surface stress of the microcrystalline glass product is 600 MPa or more, preferably 650 MPa or more, and more preferably 700 MPa or more. The ion-exchange layer depth of the microcrystalline glass product is 20 μm or more, preferably 30 μm or more, and more preferably 40 μm or more. In some embodiments, the value of $Na_2O/Y_2O_3$ may be 0, greater than 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.3, 2.5, 2.7, 3.0, 3.3, 3.5, 3.7, 4.0, 4.3, 4.5, 4.7, 5.0, 5.3, 5.5, 5.7, and 6.0.

In some embodiments of the present invention, when a content ratio $Y_2O_3/(Al_2O_3+SiO_2)$ of $Y_2O_3$ to the total content $(Al_2O_3+SiO_2)$ of $Al_2O_3$ and $SiO_2$ is controlled to be greater than 0 but less than or equal to 0.15, the crystallization of glass can be optimized, so that the microcrystalline glass and the microcrystalline glass product have an appropriate crystallinity, and thus the microcrystalline glass and the microcrystalline glass product have excellent properties. Preferably, $Y_2O_3/(Al_2O_3+SiO_2)$ is 0.01-0.12, and more preferably 0.03-0.09. The drop ball test height of the microcrystalline glass and the microcrystalline glass product becomes larger. In some embodiments, the drop ball test height of the microcrystalline glass product is preferably 1300 mm or more, more preferably 1400 mm or more, and further preferably 1500 mm or more. In some embodiments, the value of $Y_2O_3/(Al_2O_3+SiO_2)$ may be greater than 0, 0.01, 0.02, 0.03, 0.04, 0.05, 0.06, 0.07, 0.08, 0.09, 0.1, 0.11, 0.12, 0.13, 0.14, and 0.15.

$B_2O_3$ can improve a network structure of glass, optimize the chemical strengthening properties of the glass and the microcrystalline glass, and increase the drop ball height of the microcrystalline glass product. When the content of $B_2O_3$ exceeds 5%, it is not conducive to glass formation and is easy to crystallize during formation. Therefore, the upper limit of the content of $B_2O_3$ is 5%, preferably 3%, and more preferably 2%. Further preferably, $B_2O_3$ is excluded. In some embodiments, about 0%, greater than 0%, 0.1%, 0.5%, 1.0%, 1.5%, 2.0%, 2.5%, 3.0%, 3.5%, 4.0%, 4.5%, and 5.0% of $B_2O_3$ may be included.

ZnO can reduce the smelting difficulty of glass. However, when the content of ZnO is high, it may promote the low-temperature crystallization of glass, reduce the crystallinity and transmittance of the microcrystalline glass and the microcrystalline glass product, and increase the haze of the microcrystalline glass and the microcrystalline glass product. Therefore, the upper limit of the content of ZnO is 2%, preferably 1%. Further preferably, ZnO is excluded. In some embodiments, about 0%, greater than 0%, 0.1%, 0.5%, 1.0%, 1.5%, and 2.0% of ZnO may be included.

MgO can reduce the smelting difficulty of glass, and is conducive to increase the drop ball height of the microcrystalline glass and the microcrystalline glass product. However, it is easy to promote the low-temperature crystallization of the glass and reduce the crystallinity and transmittance of the microcrystalline glass and the microcrystalline glass product. Therefore, the upper limit of the content of MgO is 2%, and preferably 1%. In some embodiments, about 0%, greater than 0%, 0.1%, 0.5%, 1.0%, 1.5%, and 2.0% of MgO may be included.

SrO is an optional component that improves the low-temperature melting property of glass and suppresses crystallization during glass formation. When the content is too much, it may affect the glass formation, and it is easy to crystallize during formation. Therefore, the range of the SrO content in the present invention is 0 to 5%, preferably 0 to 3%, and more preferably 0 to 1%. Further preferably, SrO is excluded. In some embodiments, about 0%, greater than 0%, 0.1%, 0.5%, 1.0%, 1.5%, 2.0%, 2.5%, 3.0%, 3.5%, 4.0%, 4.5%, and 5.0% of SrO may be included.

BaO is an optional component that facilitates improving the glass formation properties of glass. When the content is too large, it is unfavorable for glass formation. Therefore, the range of the BaO content in the present invention is 0 to 5%, preferably 0 to 3%, and more preferably 0 to 1%. Further preferably, BaO is excluded. In some embodiments, about 0%, greater than 0%, 0.1%, 0.5%, 1.0%, 1.5%, 2.0%, 2.5%, 3.0%, 3.5%, 4.0%, 4.5%, and 5.0% of BaO may be included.

CaO can increase the hardness of glass, and when the content is too much, the glass is easy to be milky when it is formed. Therefore, the range of the CaO content in the present invention is 0 to 5%, preferably 0 to 3%, and more preferably 0 to 1%. Further preferably, CaO is excluded. In some embodiments, about 0%, greater than 0%, 0.1%, 0.5%, 1.0%, 1.5%, 2.0%, 2.5%, 3.0%, 3.5%, 4.0%, 4.5%, and 5.0% of CaO may be included.

$TiO_2$ is an optional component that facilitates reducing the melting temperature of the matrix glass and improving the chemical stability. 5% or less of $TiO_2$ contained in the present invention can make the crystallization process of the matrix glass easier to control, preferably 3% or less, and more preferably 1% or less. In some embodiments, further preferably, $TiO_2$ is excluded. In some embodiments, about 0%, greater than 0%, 0.1%, 0.3%, 0.5%, 1%, 1.5%, 2%, 2.5%, 3%, 3.5%, 4%, 4.5%, and 5% of $TiO_2$ may be included.

$Ln_2O_3$ ($Ln_2O_3$ is one or more of $La_2O_3$, $Gd_2O_3$, and $Yb_2O_3$) is an optional component that improves the hardness and chemical stability of the microcrystalline glass and suppresses glass formation and crystallization. Too much content may affect the chemical strengthening property of the glass and reduce the strength of the microcrystalline glass product. Therefore, the range of the $Ln_2O_3$ content in the present invention is 0 to 5%, preferably 0 to 4%, and more preferably 0 to 3%. Further preferably, $Ln_2O_3$ is excluded. In some embodiments, about 0%, greater than 0%, 0.1%, 0.5%, 1.0%, 1.5%, 2.0%, 2.5%, 3.0%, 3.5%, 4.0%, 4.5%, and 5.0% of $Ln_2O_3$ may be included.

In some embodiments, the glass, the microcrystalline glass or the microcrystalline glass product may further include 0-2% of a clarifying agent to improve the defoaming ability of the glass, the microcrystalline glass or the microcrystalline glass product. The clarifying agent includes, but is not limited to, one or more of $Sb_2O_3$, $SnO_2$, SnO, $CeO_2$, F, Cl, and Br. Preferably, $Sb_2O_3$ is used as the clarifying agent. When the clarifying agents are present alone or in combination, the upper limit of the content of the clarifying agent is preferably 1%, and more preferably 0.5%. In some embodiments, the content of one or more of the clarifying agents is 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, and 2.0%.

In order to obtain the desired mechanical properties, optical properties, production properties, chemical strengthening properties and other excellent properties of the glass, the microcrystalline glass or the microcrystalline glass product of the present invention, in some embodiments of the present invention, preferably, F is excluded, and/or $Ta_2O_5$ is excluded.

PbO and $As_2O_3$ are toxic substances, and even a small amount of addition does not satisfy the requirements of environmental protection. Therefore, the present invention preferably does not include PbO and $As_2O_3$ in some embodiments.

In some embodiments of the present invention, by containing a colorant, a colored matrix glass, microcrystalline glass or microcrystalline glass product may be prepared, and the matrix glass, the microcrystalline glass or the microcrystalline glass product may exhibit different colors. The colorant includes the following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_5$: 0-8%; and/or $CeO_2$: 0-4%. The weight percentage of the colorant and its function are detailed as follows:

The brown or green matrix glass, microcrystalline glass or microcrystalline glass product prepared by the present invention uses NiO, $Ni_2O_3$ or $Pr_2O_5$ as the colorant. NiO and $Ni_2O_3$ are colorants, used for preparing brown or green matrix glass, microcrystalline glass or microcrystalline glass product. The two components can be used alone or in combination, and the respective contents are generally 4% or less, and preferably 3% or less. If the content exceeds 4%, the colorant cannot be dissolved well in the matrix glass, the microcrystalline glass or the microcrystalline glass product, and the lower limit of the content of the colorant is 0.1% or more, and if the content is less than 0.1%, the color of the matrix glass, the microcrystalline glass or the microcrystalline glass product is not obvious. In some embodiments, about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% of NiO or $Ni_2O_3$ may be included. In mixed use, the total amount of NiO and $Ni_2O_3$ is generally 4% or less, and the lower limit of the total amount is 0.1% or more. In some embodiments, about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% of NiO and $Ni_2O_3$ may be included. $Pr_2O_5$ is used as the colorant for the green matrix glass, microcrystalline glass or microcrystalline glass product, and is used alone, and the content is generally 8% or less, and preferably 6% or less. The lower limit of the content of $Pr_2O_5$ is 0.4% or more, and if the content is lower than 0.4%, the color of the matrix glass, the microcrystalline glass or the microcrystalline glass product is not obvious. In some embodiments, about 0.4%, 0.6%, 0.8%, 1.0%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8%, 6.0%, 6.2%, 6.4%, 6.6%, 6.8%, 7.0%, 7.2%, 7.4%, 7.6%, 7.8%, and 8.0% of $Pr_2O_5$ may be included.

The blue matrix glass, microcrystalline glass or microcrystalline glass product prepared by the present invention uses CoO or $Co_2O_3$ as the colorant. The two colorants can be used alone or in combination, and the respective contents are generally 2% or less, and preferably 1.8% or less. If the content exceeds 2%, the colorants cannot be dissolved well in the matrix glass, the microcrystalline glass or the microcrystalline glass product. The lower limit of the content of the colorants is 0.05% or more, and if the content is less than 0.05%, the color of the matrix glass, the microcrystalline glass or the microcrystalline glass product is not obvious. In some embodiments, about 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, and 2.0% of CoO or $Co_2O_3$ may be included. In mixed use, the total amount of CoO and $Co_2O_3$ does not exceed 2%, and the lower limit of the total amount is 0.05% or more. In some embodiments, about 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0% of CoO and $Co_2O_3$ may be included.

The yellow matrix glass, microcrystalline glass or microcrystalline glass product prepared by the present invention uses $Cu_2O$ or $CeO_2$ as the colorant, and the two colorants are used alone or in combination, and the lower limit of the respective content is 0.5% or more, and if the content is less than 0.5%, the color of the matrix glass, the microcrystalline glass or the microcrystalline glass product is not obvious. $Cu_2O$ used alone is 4% or less, preferably 3% or less. If the content exceeds 4%, the matrix glass may easily crystallize. In some embodiments, about 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% of $Cu_2O_5$ may be included. The content of $CeO_2$ used alone is generally 4% or less, and preferably 3% or less. If the content exceeds 4%, the glossiness of the matrix glass, the microcrystalline glass or the microcrystalline glass product may be poor. In some embodiments, about 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% of $CeO_2$ may be included. Moreover, adding a small amount of $CeO_2$ to the glass has a defoaming effect, and $CeO_2$ can also be used as a clarifying agent in the glass. If two colorants are used in combination, the total amount is generally 4% or less, and the lower limit of the total amount is 0.5% or more. In some embodiments, about 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% of $CeO_2$ and $Cu_2O$ may be included.

The black or smoky gray matrix glass, microcrystalline glass or microcrystalline glass product prepared by the present invention uses $Fe_2O_3$ alone as the colorant; or uses a mixture of $Fe_2O_3$ and CoO as the colorant; or uses a mixture of $Fe_2O_3$ and $Co_2O_3$ as the colorant; or uses a mixture of $Fe_2O_3$, CoO and NiO as the colorant; or uses a mixture of $Fe_2O_3$, $Co_2O_3$ and NiO as the colorant. The colorant for preparing the black and smoky gray matrix glass, microcrystalline glass or microcrystalline glass product is mainly colored with $Fe_2O_3$, the content is 7% or less, preferably 5% or less, and the lower limit of the content is 0.2% or more. In some embodiments, about 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.5%, 5.0%, 5.5%, 6.0%, 6.5%, and 7.0% of $Fe_2O_3$ may be included. CoO and $Co_2O_3$ absorb visible light, which can deepen the coloring degree of the matrix glass, the microcrystalline glass or the microcrystalline glass products. Generally, when mixed with $Fe_2O_3$, the respective content is 0.6% or less, and the lower limit is 0.2% or more. In some embodiments, about 0.2%, 0.3%, 0.4%, 0.5%, and 0.6% of CoO and/or $Co_2O_3$ may be included. NiO absorbs visible light and can deepen the coloring degree of the matrix glass, the microcrystalline glass or the microcrystalline glass products. Generally, in mixed use, the content is 1% or less, and the lower limit of the total amount is 0.2% or more. In some embodiments, about 0.2%, 0.3%, 0.4%, 0.5%, 0.6%, 0.7%, 0.8%, 0.9%, and 1.0% of NiO may be included.

The purple matrix glass, microcrystalline glass or microcrystalline glass product prepared by the present invention uses $MnO_2$ as the colorant, the content of which is generally 4% or less, preferably 3% or less, and the lower limit of the content is 0.1% or more, and if the content is less than 0.1%, the color of the matrix glass, the microcrystalline glass or the microcrystalline glass product is not obvious. In some embodiments, about 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, and 4.0% of $MnO_2$ may be included.

The pink matrix glass, microcrystalline glass or microcrystalline glass product prepared by the present invention uses $Er_2O_3$ as the colorant, the content of which is generally 8% or less, and preferably 6% or less. Due to the low coloring efficiency of the rare earth element $Er_2O_3$, when the content used exceeds 8%, the color of the matrix glass, the microcrystalline glass or the microcrystalline glass product cannot be further deepened, but the cost is increased. The lower limit of its content is 0.4% or more, and if the content less than 0.4%, the color of the matrix glass, the microcrystalline glass or the microcrystalline glass product is not obvious. In some embodiments, about 0.4%, 0.6%, 0.8%, 1.0%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8%, 6.0%, 6.2%, 6.4%, 6.6%, 6.8%, 7.0%, 7.2%, 7.4%, 7.6%, 7.8%, and 8.0% of $Er_2O_3$ may be included.

The purple-red matrix glass, microcrystalline glass or microcrystalline glass product prepared by the present invention uses $Nd_2O_3$ as the colorant, the content of which is generally 8% or less, and preferably 6% or less. Due to the low coloring efficiency of the rare earth element $Nd_2O_3$, when the content used exceeds 8%, the color of the matrix glass, the microcrystalline glass or the microcrystalline glass product cannot be further deepened, but the cost is increased. The lower limit of its content is 0.4% or more, and if the content is less than 0.4%, the color of the matrix glass, the microcrystalline glass or the microcrystalline glass products is not obvious. In some embodiments, about 0.4%, 0.6%, 0.8%, 1.0%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8%, 6.0%, 6.2%, 6.4%, 6.6%, 6.8%, 7.0%, 7.2%, 7.4%, 7.6%, 7.8%, and 8.0% of $Nd_2O_3$ may be included.

The red matrix glass, microcrystalline glass or microcrystalline glass product prepared by the present invention uses a mixed colorant of $Er_2O_3$, $Nd_2O_3$, and $MnO_2$. Er ions in the glass absorb at 400-500 nm, Mn ions mainly absorb at 500 nm, and Nd ions has strong absorption mainly at 580 nm. The mixture of the three substances can prepare the red matrix glass, microcrystalline glass or microcrystalline glass product. Because $Er_2O_3$ and $Nd_2O_3$ are of rare earth coloring, the coloring ability is relatively weak. The usage amount of $Er_2O_3$ is within 6%. The usage amount of $Nd_2O_3$ is within 4%, and the coloring ability of $MnO_2$ is strong, and the usage amount of $MnO_2$ is within 2%. The lower limit of the total amount of mixed colorants used is 0.9% or more.

As used herein, "exclude" and "0%" means that the compound, molecule or element is not intentionally added as a raw material to the matrix glass, the microcrystalline glass or the microcrystalline glass product of the present invention. However, the raw materials and/or equipment for producing the matrix glass, the microcrystalline glass or the microcrystalline glass product may contain some impurities or components that are not intentionally added, which may be contained in small or trace amounts in the final matrix glass, microcrystalline glass or microcrystalline glass product. This situation is also within the protection scope of the present invention patent.

In some embodiments of the present invention, the crystal phase in the microcrystalline glass and the microcrystalline glass product contains lithium monosilicate crystals, which provides high strength for the microcrystalline glass and the microcrystalline glass product of the present invention. The fracture toughness of the microcrystalline glass and the microcrystalline glass product becomes higher. The drop ball test height and four-point bending strength of the microcrystalline glass and the microcrystalline glass product become larger. The microcrystalline glass of the present invention has excellent chemical strengthening properties, and can also be chemically strengthened to obtain additional mechanical strength. Through reasonable component design, the microcrystalline glass and the microcrystalline glass product of the present invention can obtain suitable grain sizes, so that the microcrystalline glass and the microcrystalline glass product of the present invention have high strength. The microcrystalline glass and the microcrystalline glass product of the present invention have good crystallinity, so that the microcrystalline glass and the microcrystalline glass product of the present invention have excellent mechanical properties. The crystallinity herein refers to the degree of crystal integrity. The arrangement of particles inside the completely crystallized crystal is relatively regular, the diffraction lines are strong, sharp and symmetrical, and the half-height width of the diffraction peak is close to the width measured by an instrument. There are defects such as dislocations in crystals with poor crystallinity, which makes the peak shape of the diffraction line wide and diffuse. The poorer the crystallinity is, the weaker the diffraction ability is and the wider the diffraction peak is, until they disappear into the background. In some embodiments, the crystallinity of the microcrystalline glass product or the microcrystalline glass is 50% or more, preferably 60% or more, and more preferably 70% or more.

The grain size and type in the microcrystalline glass or the microcrystalline glass product of the present invention may affect the haze and transmittance of the microcrystalline glass or the microcrystalline glass product. The smaller the grain is, the higher the transmittance is. The smaller the haze is, the higher the transmittance is. In some embodiments, the haze of the microcrystalline glass product or the microcrystalline glass with a thickness of 1 mm or less is 0.15% or less, preferably 0.12% or less, and more preferably 0.1% or less. In some embodiments, the grain size of the microcrystalline glass product or the microcrystalline glass is 50 nm or less, preferably 40 nm or less, and more preferably 30 nm or less.

In some embodiments, the crystal phase content and refractive index in the microcrystalline glass or the microcrystalline glass product of the present invention affect the |B| value of the microcrystalline glass or the microcrystalline glass product. It is observed that the microcrystalline glass or the microcrystalline glass product in the visible light range is bluish or yellowish, which affects the optical properties of the product. It is marked with the |B| value in the LAB (chromaticity value of the substance color). The microcrystalline glass or the microcrystalline glass product exhibits a low |B| value in the visible light range. In some embodiments, the average light |B| value of the microcrystalline glass or the microcrystalline glass product with a thickness of 1 mm or less at 400-800 nm is 0.6 or less, preferably 0.55 or less, and more preferably 0.5 or less.

In some embodiments, the microcrystalline glass or the microcrystalline glass product of the present invention exhibits high transparency in the visible light range (that is, the microcrystalline glass or the microcrystalline glass product is transparent). The microcrystalline glass or the microcrystalline glass product exhibits high transmittance in the visible light range. In some embodiments, average light transmittance of the microcrystalline glass product or the microcrystalline glass with the thickness of 1 mm or less at 400-800 nm is preferably 89% or more. In some preferred embodiments, the light transmittance of the microcrystalline glass product or the microcrystalline glass with the thickness of 1 mm or less at 550 nm is preferably 91% or more.

In some embodiments, antimicrobial components may be added to the matrix glass, the microcrystalline glass or the microcrystalline glass product. The microcrystalline glass or the microcrystalline glass product described herein can be used in applications such as kitchen or catering countertops, which are likely to be exposed to harmful bacteria. The antimicrobial components that can be added to the matrix glass, the microcrystalline glass or the microcrystalline glass product include, but are not limited to, Ag, AgO, Cu, CuO, $Cu_2O$, etc. In some embodiments, the separate or combined content of the antimicrobial components is 2% or less, and preferably 1% or less.

The matrix glass, the microcrystalline glass and the microcrystalline glass product of the present invention can be produced and manufactured by the following methods:

generation of the matrix glass: uniformly mixing the raw materials according to a component ratio, putting the homogeneous mixture into a platinum or quartz crucible, and according to the melting difficulty of the glass components, melting in an electric furnace or a gas furnace at a temperature ranging from 1250° C. to 1650° C. for 5-24 hours, stirring to make it uniform, cooling the mixture to an appropriate temperature and pouring into a mold, and then slowly cooling down.

The matrix glass of the present invention can be molded by a well-known method.

The matrix glass of the present invention undergoes crystallization treatment through a crystallization process after molding or molding processing, so that crystals are uniformly precipitated inside the glass. The crystallization treatment may be performed in one stage or in two stages, and the crystallization treatment is preferably performed in two stages. The nucleation process is performed at a first temperature, and then a crystal growth process is performed at a second temperature higher than the nucleation process temperature. The crystallization treatment performed at the first temperature is referred to as a first crystallization treatment, and the crystallization treatment performed at the second temperature is referred to as a second crystallization treatment.

To obtain the desired physical properties of the microcrystalline glass, the preferred crystallization process is:

The crystallization process is performed in one stage, and the nucleation process and the crystal growth process can be continuously performed. That is, the temperature is raised to a predetermined crystallization treatment temperature, and after reaching the crystallization treatment temperature, the temperature is maintained for a certain period of time, and then the temperature is lowered. The crystallization treatment temperature is preferably 600° C. to 750° C., and in order to precipitate the desired crystal phase, it is more preferably 650° C. to 700° C. The holding time at the crystallization treatment temperature is preferably 0-8 hours, and more preferably 1-6 hours.

When the crystallization treatment is performed in two stages as described above, the first temperature is preferably 470° C. to 630° C., and the second temperature is preferably 650° C. to 750° C. The holding time at the first temperature is preferably 0-24 hours, and more preferably 2-15 hours. The holding time at the second temperature is preferably 0-10 hours, and more preferably 0.5-6 hours.

The holding time of 0 hour means that the temperature drops or increases less than 1 minute after reaching its temperature.

In some embodiments, the matrix glass or the microcrystalline glass described herein can be manufactured into a molded body by various processes, the molded body includes, but is not limited to, a sheet. The process includes, but is not limited to, slit drawing, floating, rolling, and other sheet forming processes known in the art. Alternatively, the matrix glass or the microcrystalline glass can be formed by a floating method or a rolling method known in the art.

The matrix glass or the microcrystalline glass of the present invention can be used for manufacturing the glass molded body of the sheet through methods such as grinding or polishing, but the method of manufacturing the glass molded body is not limited to these methods.

The matrix glass or the microcrystalline glass of the present invention may be prepared into various shapes by hot bending or pressing methods at a certain temperature, and is not limited to these methods.

The matrix glass, the microcrystalline glass and the microcrystalline glass product of the present invention may have any thickness that is reasonably useful.

The microcrystalline glass of the present invention can not only improve the mechanical properties by precipitation of crystals, but also obtain higher strength by forming a compressive stress layer, thereby preparing the microcrystalline glass product.

In some embodiments, the matrix glass or the microcrystalline glass may be processed into a sheet, and/or shaped (such as perforated, hot-bending, etc.), polished and/or swept after shaping, and then chemically strengthened by a chemical strengthening process.

The chemical strengthening described in the present invention is an ion-exchange method. The matrix glass and the microcrystalline glass of the present invention may be ion-exchanged by a method known in the art. In the ion-exchange process, the smaller metal ions in the matrix glass or the microcrystalline glass are replaced or "exchanged" by larger metal ions of the same valence close to the matrix glass or the microcrystalline glass. The smaller ions are replaced with larger ions to build up compressive stress in the matrix glass or the microcrystalline glass to form a compressive stress layer.

In some embodiments, the metal ion is a monovalent alkali metal ion (e.g., $Na^+$, $K^+$, $Rb^+$, $Cs^+$, etc.), and the ion exchange is performed by immersing the matrix glass or the microcrystalline glass in a salt bath containing at least one molten salt of larger metal ions. The larger metal ions are used for replacing the smaller metal ions in the matrix glass. Alternatively, other monovalent metal ions such as $Ag^+$, $Tl^+$, and $Cu^+$ can also be used for exchanging monovalent ions. One or more ion-exchange processes for chemically strengthening the matrix glass or the microcrystalline glass may include, but are not limited to: immersing it in a single salt bath, or immersing it in a plurality of salt baths with the same or different compositions. There are washing and/or annealing steps between immersion.

In some embodiments, the matrix glass or the microcrystalline glass can be ion-exchanged by immersing in a salt bath of molten Na salt (such as $NaNO_3$) at a temperature of about 430° C. to 470° C. for about 6-20 hours. Preferably, the temperature range is 435° C. to 460° C. Preferably, the time range is 8-13 hours. In this embodiment, Na ions replace some of Li ions in the matrix glass or the microcrystalline glass, thereby forming a surface compression layer and exhibiting high mechanical properties. In some embodiments, the matrix glass or the microcrystalline glass can be ion-exchanged by immersing in a salt bath of molten K salt (such as $KNO_3$) at a temperature of about 400° C. to 450° C. for 1-8 hours. Preferably, the time range is 2-4 hours.

In some embodiments, there is an ion implantation method in which ions are implanted into the surface layer of the matrix glass or the microcrystalline glass, and a thermal strengthening method in which the matrix glass or the microcrystalline glass is heated and then rapidly cooled.

The performance indexes of the microcrystalline glass and/or the microcrystalline glass product and/or the matrix glass of the present invention are tested by the following methods:

Haze

A haze tester EEL57D is used for preparing a sample of 1 mm or less, and the test is carried out with GB2410-80 as the standard.

Grain Size

An SEM scanning electron microscope is used for measurement. The microcrystalline glass is subjected to surface treatment in HF acid, and then metal spraying is performed on the surface of the microcrystalline glass, and surface scanning is performed under the SEM scanning electron microscope to determine the grain size.

Light Transmittance

The light transmittance described herein is the external transmittance, sometimes referred to as the transmittance.

The sample is processed to 1 mm or less and then parallel polishing of opposite surfaces is performed, and the average light transmittance of 400-800 nm is measured with a Hitachi U-41000 spectrophotometer.

The sample is processed to 1 mm or less and then parallel polishing of opposite surfaces is performed, and the average light transmittance of 550 nm is measured with the Hitachi U-41000 spectrophotometer.

Crystallinity

XRD diffraction peaks are compared with database patterns. The crystallinity is obtained by calculating the proportion of the crystal phase diffraction intensity in the overall pattern intensity, and is internally calibrated by using pure quartz crystals.

Surface Stress and Ion-Exchange Layer Depth

The surface stress is measured using a glass surface stress meter FSM-6000LEUV.

The ion-exchange layer depth is measured using a glass surface stress meter SLP-2000.

As measurement conditions, a refractive index of the sample is 1.54 and an optical elastic constant is 25.3 [(nm/cm)/Mpa] for calculation.

Drop Ball Test Height

A 150×57×0.55 mm microcrystalline glass product sample is placed on a glass bearing fixture, and a 132 g steel ball drops from a predetermined height, the maximum drop ball test height that the sample can withstand the impact without breaking. Specifically, the test is carried out from the drop ball test height of 800 mm, and the height is changed sequentially through 850 mm, 900 mm, 950 mm, 1000 mm and above without breaking. For the examples with the "drop ball test height", the microcrystalline glass product is used as a test object. The test data recorded as 1000 mm in the examples indicates that even if the steel ball drops from a height of 1000 mm, the microcrystalline glass product does not break and withstands the impact. In the present invention, the drop ball test height is sometimes referred to as the drop ball height.

Body Drop Height

A 150×57×0.55 mm microcrystalline glass product sample is placed on a glass bearing fixture, and a 32 g steel ball drops from a predetermined height, the maximum drop ball test height that the sample can withstand the impact without breaking. Specifically, the test is carried out from the drop ball test height of 500 mm, and the height is changed sequentially through 550 mm, 600 mm, 650 mm, 700 mm and above without breaking. For the examples with the "body drop height", the microcrystalline glass is used as a test object. The test data recorded as 1000 mm in the examples indicates that even if the steel ball drops from a height of 1000 mm, the microcrystalline glass does not break and withstands the impact.

Fracture Toughness

The method of directly measuring the size of an indentation propagation crack is used, the sample size is 2 mm×4 mm×20 mm, after chamfering, grinding and polishing, and after the sample preparation is completed, a Vickers hardness indenter is used for applying a force of 49 N to the sample and maintain it for 30 s. After the indentation is made, the fracture strength is measured by a three-point bending method.

Four-Point Bending Strength

A microcomputer-controlled electronic universal testing machine CMT6502 is used, and the sample size is the thickness of 1 mm or less, and the test is carried out according to ASTM C 158-2002.

The thickness of the sample is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

Vickers Hardness

It is expressed by dividing the load (N) when a diamond quadrangular pyramid indenter with an opposite surface angle of 136° is pressed into a pyramid-shaped depression on the test surface, by the surface area (mm$^2$) calculated by the length of the depression. The test load is 100 (N) and the holding time is 15 (seconds). In the present invention, the Vickers hardness is sometimes referred to as hardness for short.

|B| Value

Minolta CM-700d is used for B value detection. The matched long tube and short tube for calibration are used for performing zero calibration and whiteboard calibration of instrument, respectively. After calibration, the long tube is used for performing an air test to determine the stability and calibration reliability of the instrument (B≤0.05). After the instrument is calibrated, the product is placed on the zero-position long tube for testing.

The |B| value is an absolute value of the B value.

Coefficient of Thermal Expansion

The coefficient of thermal expansion ($\alpha_{20°\,C.-120°\,C.}$) is tested according to the GB/T7962.16-2010 test method.

Refractive Index

The refractive index (nd) is tested according to the GB/T7962.1-2010 method.

The microcrystalline glass product of the present invention has the following properties.

1) In some embodiments, the surface stress of the microcrystalline glass product is 600 MPa or more, preferably 650 MPa or more, and more preferably 700 MPa or more.

2) In some embodiments, the four-point bending strength of the microcrystalline glass product is 600 MPa or more, preferably 650 MPa or more, and more preferably 700 MPa or more.

3) In some embodiments, the ion-exchange layer depth of the microcrystalline glass product is 20 μm or more, preferably 30 μm or more, and more preferably 40 μm or more.

4) In some embodiments, the drop ball test height of the microcrystalline glass product is 1300 mm or more, preferably 1400 mm or more, and more preferably 1500 mm or more.

5) In some embodiments, the fracture toughness of the microcrystalline glass product is 1 MPa·m$^{1/2}$ or more, preferably 1.1 MPa·m$^{1/2}$ or more, and more preferably 1.2 MPa·m$^{1/2}$ or more.

6) In some embodiments, the Vickers hardness ($H_v$) of the microcrystalline glass product is 700 kgf/mm$^2$ or more, preferably 720 kgf/mm$^2$ or more, and more preferably 730 kgf/mm$^2$ or more.

7) In some embodiments, the crystallinity of the microcrystalline glass product is 50% or more, preferably 60% or more, and more preferably 70% or more.

8) In some embodiments, the grain size of the microcrystalline glass product is 50 nm or less, preferably 40 nm or less, and more preferably 30 nm or less.

9) In some embodiments, the haze of the microcrystalline glass product with the thickness of 1 mm or less is 0.15% or less, preferably 0.12% or less, and more preferably 0.1% or less. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

10) In some embodiments, the average transmittance of the microcrystalline glass product with the thickness of 1 mm or less at 400-800 nm is 89% or more. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

11) In some embodiments, the transmittance of the microcrystalline glass product with the thickness of 1 mm or less at 550 nm is 91% or more. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

12) In some embodiments, the average light |B| value of the microcrystalline glass product with the thickness of 1 mm or less at 400-800 nm is 0.6 or less, preferably 0.55 or less, and more preferably 0.5 or less. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

The microcrystalline glass of the present invention has the following properties.

1) In some embodiments, the crystallinity of the microcrystalline glass is 50% or more, preferably 60% or more, and more preferably 70% or more.

2) In some embodiments, the grain size of the microcrystalline glass is 50 nm or less, preferably 40 nm or less, and more preferably 30 nm or less.

3) In some embodiments, the haze of the microcrystalline glass with the thickness of 1 mm or less is 0.15% or less, preferably 0.12% or less, and more preferably 0.1% or less. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

4) In some embodiments, the average transmittance of the microcrystalline glass with the thickness of 1 mm or less at 400-800 nm is 89% or more. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

5) In some embodiments, the transmittance of the microcrystalline glass with the thickness of 1 mm or less at 550 nm is 91% or more. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

6) In some embodiments, the body drop height of the microcrystalline glass is 1000 mm or more, preferably 1100 mm or more, and more preferably 1200 mm or more.

7) In some embodiments, the average light |B| value of the microcrystalline glass with the thickness of 1 mm or less at 400-800 nm is 0.6 or less, preferably 0.55 or less, and more preferably 0.5 or less. The thickness is preferably 0.2-1 mm, more preferably 0.3-0.9 mm, further preferably 0.5-0.8 mm, and more further preferably 0.55 mm or 0.6 mm or 0.68 mm or 0.72 mm or 0.75 mm.

8) In some embodiments, the Vickers hardness ($H_v$) of the microcrystalline glass is 650 kgf/mm$^2$ or more, preferably 680 kgf/mm$^2$ or more, and more preferably 700 kgf/mm$^2$ or more.

9) In some embodiments, the coefficient of thermal expansion ($\alpha_{20° C.-120° C.}$) of the microcrystalline glass is 75-95×10$^{-7}$/K.

10) In some embodiments, the refractive index ($n_d$) of the microcrystalline glass is 1.5700-1.5800.

The matrix glass of the present invention has the following properties.

1) In some embodiments, the coefficient of thermal expansion ($\alpha_{20° C.-120° C.}$) of the matrix glass is 50×10$^{-7}$/K-70×10$^{-7}$/K.

2) In some embodiments, the refractive index (nd) of the matrix glass is 1.5600-1.5700.

The microcrystalline glass, the microcrystalline glass product and the matrix glass of the present invention can be widely manufactured into glass cover plates or glass components due to the excellent properties above. Moreover, the microcrystalline glass, the microcrystalline glass product and the matrix glass of the present invention are applied to electronic devices or display devices, such as mobile phones, watches, computers, touch screens, etc., for manufacturing protective glass of mobile phones, smart phones, tablets, notebook computers, PDAs, televisions, personal computers, MTA machines or industrial displays, or for manufacturing touch screens, protective windows, car windows, train windows, aviation machinery windows, touch screen protective glass, or for manufacturing hard disk substrates or solar cell substrates, or for manufacturing white household appliances, such as for manufacturing refrigerator parts or kitchenware.

EXAMPLES

To further clearly describe and illustrate the technical solutions of the present invention, the following non-limiting examples are provided. The examples of the present invention have gone through many efforts to ensure the accuracy of the values (e.g., quantity, temperature, etc.), but some errors and deviations are necessarily considered. The composition itself is given in weight % based on the oxide and has been standardized to 100%.

Example of Matrix Glass

This example adopts the above-mentioned method for manufacturing a matrix glass to obtain the matrix glass having the components as shown in Tables 1-4. In addition, the characteristics of the matrix glass are measured by the test method described in the present invention, and the measurement results are shown in Tables 1-4.

TABLE 1

| Component (wt %) | 1# | 2# | 3# | 4# | 5# | 6# | 7# | 8# | 9# |
|---|---|---|---|---|---|---|---|---|---|
| $SiO_2$ | 53 | 54 | 55 | 56 | 57 | 58 | 59 | 60 | 61 |
| $Al_2O_3$ | 11.5 | 11 | 10 | 11 | 11 | 8 | 8 | 8 | 9 |
| $Li_2O$ | 13 | 13.5 | 15 | 14.5 | 15 | 16 | 18 | 13 | 13 |
| $Na_2O$ | 1 | 1 | 2 | 1 | 2 | 1 | 1 | 1 | 3 |
| $P_2O_5$ | 4 | 4 | 4 | 4 | 5 | 6 | 4 | 5 | 4 |
| $ZrO_2$ | 10 | 11 | 8.5 | 8 | 7 | 8 | 7 | 10 | 7 |
| $Y_2O_3$ | 6 | 5 | 4 | 3 | 3 | 3 | 3 | 3 | 3 |
| $K_2O$ | 1 | 0 | 0 | 0 | 0 | 0 | 0 | 0 | 0 |
| $B_2O_3$ | 0 | 0 | 0 | 2 | 0 | 0 | 0 | 0 | 0 |
| $ZnO$ | 0 | 0 | 0 | 0 | 0 | 0 | 0 | 0 | 0 |
| $MgO$ | 0 | 0 | 1 | 0 | 0 | 0 | 0 | 0 | 0 |
| $SrO$ | 0 | 0 | 0 | 0 | 0 | 0 | 0 | 0 | 0 |
| $BaO$ | 0 | 0 | 0 | 0 | 0 | 0 | 0 | 0 | 0 |
| $TiO_2$ | 0 | 0 | 0 | 0 | 0 | 0 | 0 | 0 | 0 |
| $CaO$ | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0.5 | 0.5 | 0.5 | 0.5 | 0 | 0 | 0 | 0 | 0 |
| In total | 100 | 100 | 100 | 100 | 100 | 100 | 100 | 100 | 100 |
| $Y_2O_3/ZrO_2$ | 0.6 | 0.5 | 0.5 | 0.4 | 0.4 | 0.4 | 0.4 | 0.3 | 0.4 |
| $(Li_2O + ZrO_2 + P_2O_5)/Y_2O_3$ | 4.5 | 5.7 | 6.9 | 8.8 | 9.0 | 10.0 | 9.7 | 9.3 | 8.0 |
| $Al_2O_3/(Li_2O + ZrO_2 + P_2O_5)$ | 0.43 | 0.39 | 0.36 | 0.42 | 0.41 | 0.27 | 0.28 | 0.29 | 0.38 |
| $Na_2O/Y_2O_3$ | 0.2 | 0.2 | 0.5 | 0.3 | 0.7 | 0.3 | 0.3 | 0.3 | 1.0 |
| $Y_2O_3/(Al_2O_3 + SiO_2)$ | 0.09 | 0.08 | 0.06 | 0.04 | 0.04 | 0.05 | 0.04 | 0.04 | 0.04 |
| $\alpha_{20°C.-120°C.}$ ($\times 10^{-7}$/K) | 62 | 65 | 65 | 63 | 63 | 68 | 68 | 65 | 68 |
| $n_d$ | 1.5629 | 1.5615 | 1.5601 | 1.5659 | 1.5633 | 1.5619 | 1.5689 | 1.5642 | 1.5677 |

TABLE 2

| Component (wt %) | 10# | 11# | 12# | 13# | 14# | 15# | 16# | 17# | 18# |
|---|---|---|---|---|---|---|---|---|---|
| $SiO_2$ | 62 | 63 | 53 | 53 | 50 | 51 | 52 | 64 | 65 |
| $Al_2O_3$ | 8 | 8 | 12 | 9 | 15 | 8 | 14 | 8 | 8 |
| $Li_2O$ | 14.5 | 13 | 20 | 15 | 13 | 22 | 15 | 13 | 13 |
| $Na_2O$ | 1 | 1 | 1 | 1 | 0 | 1 | 4 | 0 | 0 |
| $P_2O_5$ | 4 | 5 | 4 | 7 | 9 | 4 | 4 | 4 | 4 |
| $ZrO_2$ | 7 | 7 | 7 | 12 | 6 | 12 | 8 | 7 | 8 |
| $Y_2O_3$ | 3 | 3 | 3 | 3 | 7 | 2 | 3 | 1 | 1 |
| $K_2O$ | 0 | 0 | 0 | 0 | 0 | 0 | 0 | 0 | 0 |
| $B_2O_3$ | 0 | 0 | 0 | 0 | 0 | 0 | 0 | 3 | 0 |
| $ZnO$ | 0 | 0 | 0 | 0 | 0 | 0 | 0 | 0 | 1 |
| $MgO$ | 0 | 0 | 0 | 0 | 0 | 0 | 0 | 0 | 0 |
| $SrO$ | 0 | 0 | 0 | 0 | 0 | 0 | 0 | 0 | 0 |
| $BaO$ | 0 | 0 | 0 | 0 | 0 | 0 | 0 | 0 | 0 |
| $TiO_2$ | 0 | 0 | 0 | 0 | 0 | 0 | 0 | 0 | 0 |
| $CaO$ | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0.5 | 0 | 0 | 0 | 0 | 0 | 0 | 0 | 0 |
| In total | 100 | 100 | 100 | 100 | 100 | 100 | 100 | 100 | 100 |
| $Y_2O_3/ZrO_2$ | 0.4 | 0.4 | 0.4 | 0.3 | 1.2 | 0.2 | 0.4 | 0.1 | 0.1 |
| $(Li_2O + ZrO_2 + P_2O_5)/Y_2O_3$ | 8.5 | 8.3 | 10.3 | 11.3 | 4.0 | 19.0 | 9.0 | 24.0 | 25.0 |
| $Al_2O_3/(Li_2O + ZrO_2 + P_2O_5)$ | 0.31 | 0.32 | 0.39 | 0.26 | 0.54 | 0.21 | 0.52 | 0.33 | 0.32 |
| $Na_2O/Y_2O_3$ | 0.3 | 0.3 | 0.3 | 0.3 | 0.0 | 0.5 | 1.3 | 0.0 | 0.0 |
| $Y_2O_3/(Al_2O_3 + SiO_2)$ | 0.04 | 0.04 | 0.05 | 0.05 | 0.11 | 0.03 | 0.05 | 0.01 | 0.01 |
| $\alpha_{20°C.-120°C.}$ ($\times 10^{-7}$/K) | 69 | 69 | 68 | 65 | 60 | 58 | 59 | 62 | 70 |
| $n_d$ | 1.5601 | 1.5622 | 1.5610 | 1.5612 | 1.5611 | 1.5610 | 1.5608 | 1.5602 | 1.5626 |

TABLE 3

| Component (wt %) | 19# | 20# | 21# | 22# | 23# | 24# | 25# | 26# | 27# |
|---|---|---|---|---|---|---|---|---|---|
| $SiO_2$ | 54 | 55 | 55 | 45 | 46 | 47 | 48 | 49 | 66 |
| $Al_2O_3$ | 8 | 8 | 8 | 10 | 17 | 16 | 10 | 10 | 8 |
| $Li_2O$ | 15 | 15 | 15 | 25 | 18 | 18 | 24 | 23 | 10 |
| $Na_2O$ | 0 | 4 | 2 | 0 | 0 | 0 | 0 | 0 | 0 |
| $P_2O_5$ | 4 | 4 | 4 | 4 | 4 | 4 | 4 | 4 | 4 |
| $ZrO_2$ | 9 | 9 | 9 | 8 | 9 | 9 | 9 | 9 | 9 |
| $Y_2O_3$ | 4 | 3 | 3 | 8 | 3 | 3 | 3 | 3 | 3 |
| $K_2O$ | 4 | 0 | 2 | 0 | 0 | 0 | 0 | 0 | 0 |
| $B_2O_3$ | 0 | 0 | 0 | 0 | 0 | 0 | 0 | 0 | 0 |
| ZnO | 0 | 0 | 0 | 0 | 0 | 0 | 2 | 0 | 0 |
| MgO | 0 | 0 | 0 | 0 | 0 | 0 | 0 | 2 | 0 |
| SrO | 2 | 0 | 0 | 0 | 3 | 0 | 0 | 0 | 0 |
| BaO | 0 | 2 | 0 | 0 | 0 | 3 | 0 | 0 | 0 |
| $TiO_2$ | 0 | 0 | 2 | 0 | 0 | 0 | 0 | 0 | 0 |
| CaO | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0 | 0 | 0 | 0 | 0 | 0 | 0 | 0 | 0 |
| In total | 100 | 100 | 100 | 100 | 100 | 100 | 100 | 100 | 100 |
| $Y_2O_3/ZrO_2$ | 0.4 | 0.3 | 0.3 | 1.0 | 0.3 | 0.3 | 0.3 | 0.3 | 0.3 |
| $(Li_2O + ZrO_2 + P_2O_5)/Y_2O_3$ | 7.0 | 9.3 | 9.3 | 4.6 | 10.3 | 10.3 | 12.3 | 12.0 | 7.7 |
| $Al_2O_3/(Li_2O + ZrO_2 + P_2O_5)$ | 0.29 | 0.29 | 0.29 | 0.27 | 0.55 | 0.52 | 0.27 | 0.28 | 0.35 |
| $Na_2O/Y_2O_3$ | 0.0 | 1.3 | 0.7 | 0.0 | 0.0 | 0.0 | 0.0 | 0.0 | 0.0 |
| $Y_2O_3/(Al_2O_3 + SiO_2)$ | 0.06 | 0.05 | 0.05 | 0.15 | 0.05 | 0.05 | 0.05 | 0.05 | 0.04 |
| $\alpha_{20°C.-120°C.}$ ($\times 10^{-7}$/K) | 62 | 70 | 70 | 53 | 52 | 52 | 65 | 64 | 63 |
| $n_d$ | 1.5650 | 1.5625 | 1.5608 | 1.5632 | 1.5667 | 1.5611 | 1.5632 | 1.5688 | 1.5655 |

TABLE 4

| Component (wt %) | 28# | 29# | 30# | 31# | 32# | 33# | 34# |
|---|---|---|---|---|---|---|---|
| $SiO_2$ | 67 | 68 | 69 | 70 | 49 | 50 | 55 |
| $Al_2O_3$ | 8 | 8 | 8 | 8 | 10 | 10 | 8 |
| $Li_2O$ | 10 | 10 | 10 | 10 | 12 | 15 | 15 |
| $Na_2O$ | 1 | 0 | 0 | 0 | 2 | 6 | 2 |
| $P_2O_5$ | 2 | 2 | 2 | 2 | 4 | 4 | 4 |
| $ZrO_2$ | 9 | 9 | 8 | 7 | 15 | 9 | 9 |
| $Y_2O_3$ | 3 | 3 | 3 | 3 | 8 | 1 | 2 |
| $K_2O$ | 0 | 0 | 0 | 0 | 0 | 0 | 5 |
| $B_2O_3$ | 0 | 0 | 0 | 0 | 0 | 5 | 0 |
| ZnO | 0 | 0 | 0 | 0 | 0 | 0 | 0 |
| MgO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $TiO_2$ | 0 | 0 | 0 | 0 | 0 | 0 | 0 |
| CaO | 0 | 0 | 0 | 0 | 0 | 0 | 0 |
| $La_2O_3$ | 0 | 0 | 0 | 0 | 0 | 0 | 0 |
| $Gd_2O_3$ | 0 | 0 | 0 | 0 | 0 | 0 | 0 |
| $Yb_2O_3$ | 0 | 0 | 0 | 0 | 0 | 0 | 0 |
| $Sb_2O_3$ | 0 | 0 | 0 | 0 | 0 | 0 | 0 |
| In total | 100 | 100 | 100 | 100 | 100 | 100 | 100 |
| $Y_2O_3/ZrO_2$ | 0.3 | 0.3 | 0.4 | 0.4 | 0.5 | 0.1 | 0.2 |
| $(Li_2O + ZrO_2 + P_2O_5)/Y_2O_3$ | 7.0 | 7.0 | 6.7 | 6.3 | 3.9 | 28.0 | 14.0 |
| $Al_2O_3/(Li_2O + ZrO_2 + P_2O_5)$ | 0.38 | 0.38 | 0.40 | 0.42 | 0.32 | 0.36 | 0.29 |
| $Na_2O/Y_2O_3$ | 0.3 | 0.0 | 0.0 | 0.0 | 0.3 | 6.0 | 1.0 |
| $Y_2O_3/(Al_2O_3 + SiO_2)$ | 0.04 | 0.04 | 0.04 | 0.04 | 0.14 | 0.02 | 0.03 |
| $\alpha_{20°C.-120°C.}$ ($\times 10^{-7}$/K) | 68 | 69 | 70 | 65 | 65 | 65 | 65 |
| $n_d$ | 1.5666 | 1.5689 | 1.5634 | 1.5641 | 1.5625 | 1.5618 | 1.5625 |

Example of Microcrystalline Glass

This example adopts the above-mentioned method for manufacturing a microcrystalline glass to obtain the microcrystalline glass having the components as shown in Tables 5-8. In addition, the characteristics of each microcrystalline glass are measured by the test method described in the present invention, and the measurement results are shown in Tables 5-8.

TABLE 5

| Component (wt %) | 1# | 2# | 3# | 4# | 5# | 6# | 7# | 8# | 9# |
|---|---|---|---|---|---|---|---|---|---|
| $SiO_2$ | 53 | 54 | 55 | 56 | 57 | 58 | 59 | 60 | 61 |
| $Al_2O_3$ | 11.5 | 11 | 10 | 11 | 11 | 8 | 8 | 8 | 9 |
| $Li_2O$ | 13 | 13.5 | 15 | 14.5 | 15 | 16 | 18 | 13 | 13 |
| $Na_2O$ | 1 | 1 | 2 | 1 | 2 | 1 | 1 | 1 | 3 |
| $P_2O_5$ | 4 | 4 | 4 | 4 | 5 | 6 | 4 | 5 | 4 |
| $ZrO_2$ | 10 | 11 | 8.5 | 8 | 7 | 8 | 7 | 10 | 7 |
| $Y_2O_3$ | 6 | 5 | 4 | 3 | 3 | 3 | 3 | 3 | 3 |
| $K_2O$ | 1 | 0 | 0 | 0 | 0 | 0 | 0 | 0 | 0 |
| $B_2O_3$ | 0 | 0 | 0 | 2 | 0 | 0 | 0 | 0 | 0 |
| ZnO | 0 | 0 | 0 | 0 | 0 | 0 | 0 | 0 | 0 |
| MgO | 0 | 0 | 1 | 0 | 0 | 0 | 0 | 0 | 0 |
| SrO | 0 | 0 | 0 | 0 | 0 | 0 | 0 | 0 | 0 |
| BaO | 0 | 0 | 0 | 0 | 0 | 0 | 0 | 0 | 0 |
| $TiO_2$ | 0 | 0 | 0 | 0 | 0 | 0 | 0 | 0 | 0 |
| CaO | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0.5 | 0.5 | 0.5 | 0.5 | 0 | 0 | 0 | 0 | 0 |
| In total | 100 | 100 | 100 | 100 | 100 | 100 | 100 | 100 | 100 |
| $Y_2O_3/ZrO_2$ | 0.6 | 0.5 | 0.5 | 0.4 | 0.4 | 0.4 | 0.4 | 0.3 | 0.4 |
| $(Li_2O + ZrO_2 + P_2O_5)/Y_2O_3$ | 4.5 | 5.7 | 6.9 | 8.8 | 9.0 | 10.0 | 9.7 | 9.3 | 8.0 |
| $Al_2O_3/(Li_2O + ZrO_2 + P_2O_5)$ | 0.43 | 0.39 | 0.36 | 0.42 | 0.41 | 0.27 | 0.28 | 0.29 | 0.38 |
| $Na_2O/Y_2O_3$ | 0.2 | 0.2 | 0.5 | 0.3 | 0.7 | 0.3 | 0.3 | 0.3 | 1.0 |
| $Y_2O_3/(Al_2O_3 + SiO_2)$ | 0.09 | 0.08 | 0.06 | 0.04 | 0.04 | 0.05 | 0.04 | 0.04 | 0.04 |
| Crystal phase | Lithium monosilicate | Lithium monosilicate | Lithium monosilicate | Lithium monosilicate | Lithium monosilicate | Lithium monosilicate | Lithium monosilicate | Lithium monosilicate | Lithium monosilicate |
| Crystallinity (%) | 80 | 84 | 90 | 80 | 82 | 88 | 75 | 74 | 73 |
| Grain size (nm) | 25 | 25 | 30 | 25 | 25 | 25 | 25 | 30 | 25 |
| Haze at the thickness of 1 mm (%) | 0.09 | 0.09 | 0.09 | 0.09 | 0.09 | 0.09 | 0.09 | 0.09 | 0.09 |
| \|B\| value at the thickness of 1 mm | 0.45 | 0.45 | 0.4 | 0.45 | 0.4 | 0.45 | 0.4 | 0.42 | 0.47 |
| $H_v$ (kgf/mm$^2$) | 706 | 703 | 710 | 711 | 706 | 707 | 701 | 703 | 705 |
| Average light transmittance at the thickness of 1 mm at 400-800 nm (%) | 90 | 90 | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 | 92 | 92 |
| Body drop height (mm) | 1200 | 1200 | 1200 | 1200 | 1250 | 1200 | 1200 | 1200 | 1300 |
| $\alpha_{20°C.-120°C.}$ (×10$^{-7}$/K) | 92 | 93 | 90 | 92 | 95 | 92 | 98 | 92 | 88 |
| $n_d$ | 1.5789 | 1.5734 | 1.5711 | 1.5725 | 1.5718 | 1.5788 | 1.5755 | 1.5766 | 1.5778 |

TABLE 6

| Component (wt %) | 10# | 11# | 12# | 13# | 14# | 15# | 16# | 17# | 18# |
|---|---|---|---|---|---|---|---|---|---|
| $SiO_2$ | 62 | 63 | 53 | 53 | 50 | 51 | 52 | 64 | 65 |
| $Al_2O_3$ | 8 | 8 | 12 | 9 | 15 | 8 | 14 | 8 | 8 |
| $Li_2O$ | 14.5 | 13 | 20 | 15 | 13 | 22 | 15 | 13 | 13 |
| $Na_2O$ | 1 | 1 | 1 | 1 | 0 | 1 | 4 | 0 | 0 |
| $P_2O_5$ | 4 | 5 | 4 | 7 | 9 | 4 | 4 | 4 | 4 |
| $ZrO_2$ | 7 | 7 | 7 | 12 | 6 | 12 | 8 | 7 | 8 |
| $Y_2O_3$ | 3 | 3 | 3 | 3 | 7 | 2 | 3 | 1 | 1 |
| $K_2O$ | 0 | 0 | 0 | 0 | 0 | 0 | 0 | 0 | 0 |
| $B_2O_3$ | 0 | 0 | 0 | 0 | 0 | 0 | 0 | 3 | 0 |
| ZnO | 0 | 0 | 0 | 0 | 0 | 0 | 0 | 0 | 1 |
| MgO | 0 | 0 | 0 | 0 | 0 | 0 | 0 | 0 | 0 |
| SrO | 0 | 0 | 0 | 0 | 0 | 0 | 0 | 0 | 0 |
| BaO | 0 | 0 | 0 | 0 | 0 | 0 | 0 | 0 | 0 |
| $TiO_2$ | 0 | 0 | 0 | 0 | 0 | 0 | 0 | 0 | 0 |
| CaO | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |

TABLE 6-continued

| Component (wt %) | 10# | 11# | 12# | 13# | 14# | 15# | 16# | 17# | 18# |
|---|---|---|---|---|---|---|---|---|---|
| $Yb_2O_3$ | 0 | 0 | 0 | 0 | 0 | 0 | 0 | 0 | 0 |
| $Sb_2O_3$ | 0.5 | 0 | 0 | 0 | 0 | 0 | 0 | 0 | 0 |
| In total | 100 | 100 | 100 | 100 | 100 | 100 | 100 | 100 | 100 |
| $Y_2O_3/ZrO_2$ | 0.4 | 0.4 | 0.4 | 0.3 | 1.2 | 0.2 | 0.4 | 0.1 | 0.1 |
| $(Li_2O + ZrO_2 + P_2O_5)/Y_2O_3$ | 8.5 | 8.3 | 10.3 | 11.3 | 4.0 | 19.0 | 9.0 | 24.0 | 25.0 |
| $Al_2O_3/(Li_2O + ZrO_2 + P_2O_5)$ | 0.31 | 0.32 | 0.39 | 0.26 | 0.54 | 0.21 | 0.52 | 0.33 | 0.32 |
| $Na_2O/Y_2O_3$ | 0.3 | 0.3 | 0.3 | 0.3 | 0.0 | 0.5 | 1.3 | 0.0 | 0.0 |
| $Y_2O_3/(Al_2O_3 + SiO_2)$ | 0.04 | 0.04 | 0.05 | 0.05 | 0.11 | 0.03 | 0.05 | 0.01 | 0.01 |
| Crystal phase | Lithium monosilicate | Lithium monosilicate | Lithium monosilicate | Lithium monosilicate and lithium phosphate | Lithium monosilicate and lithium phosphate | Lithium monosilicate | Lithium monosilicate | Lithium monosilicate | Lithium monosilicate |
| Crystallinity (%) | 77 | 76 | 85 | 89 | 67 | 68 | 65 | 61 | 62 |
| Grain size (nm) | 25 | 25 | 30 | 25 | 35 | 35 | 35 | 40 | 40 |
| Haze at the thickness of 1 mm (%) | 0.09 | 0.09 | 0.09 | 0.09 | 0.11 | 0.11 | 0.12 | 0.14 | 0.14 |
| \|B\| value at the thickness of 1 mm | 0.4 | 0.45 | 0.4 | 0.48 | 0.54 | 0.54 | 0.48 | 0.54 | 0.54 |
| $H_v$ (kgf/mm$^2$) | 708 | 709 | 703 | 702 | 695 | 685 | 680 | 692 | 684 |
| Average light transmittance at the thickness of 1 mm at 400-800 nm (%) | 90 | 90 | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 | 92 | 92 |
| Body drop height (mm) | 1200 | 1200 | 1350 | 1200 | 1100 | 1100 | 1100 | 1100 | 1100 |
| $\alpha_{20°C.-120°C.}$ (×10$^{-7}$/K) | 92 | 86 | 89 | 85 | 93 | 95 | 80 | 83 | 85 |
| $n_d$ | 1.5705 | 1.5725 | 1.5709 | 1.5778 | 1.5708 | 1.5702 | 1.5726 | 1.575 | 1.5725 |

TABLE 7

| Component (wt %) | 19# | 20# | 21# | 22# | 23# | 24# | 25# | 26# | 27# |
|---|---|---|---|---|---|---|---|---|---|
| $SiO_2$ | 54 | 55 | 55 | 45 | 46 | 47 | 48 | 49 | 66 |
| $Al_2O_3$ | 8 | 8 | 8 | 10 | 17 | 16 | 10 | 10 | 8 |
| $Li_2O$ | 15 | 15 | 15 | 25 | 18 | 18 | 24 | 23 | 10 |
| $Na_2O$ | 0 | 4 | 2 | 0 | 0 | 0 | 0 | 0 | 0 |
| $P_2O_5$ | 4 | 4 | 4 | 4 | 4 | 4 | 4 | 4 | 4 |
| $ZrO_2$ | 9 | 9 | 9 | 8 | 9 | 9 | 9 | 9 | 9 |
| $Y_2O_3$ | 4 | 3 | 3 | 8 | 3 | 3 | 3 | 3 | 3 |
| $K_2O$ | 4 | 0 | 2 | 0 | 0 | 0 | 0 | 0 | 0 |
| $B_2O_3$ | 0 | 0 | 0 | 0 | 0 | 0 | 0 | 0 | 0 |
| ZnO | 0 | 0 | 0 | 0 | 0 | 0 | 2 | 0 | 0 |
| MgO | 0 | 0 | 0 | 0 | 0 | 0 | 0 | 2 | 0 |
| SrO | 2 | 0 | 0 | 0 | 3 | 0 | 0 | 0 | 0 |
| BaO | 0 | 2 | 0 | 0 | 0 | 3 | 0 | 0 | 0 |
| $TiO_2$ | 0 | 0 | 2 | 0 | 0 | 0 | 0 | 0 | 0 |
| CaO | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0 | 0 | 0 | 0 | 0 | 0 | 0 | 0 | 0 |
| In total | 100 | 100 | 100 | 100 | 100 | 100 | 100 | 100 | 100 |
| $Y_2O_3/ZrO_2$ | 0.4 | 0.3 | 0.3 | 1.0 | 0.3 | 0.3 | 0.3 | 0.3 | 0.3 |
| $(Li_2O + ZrO_2 + P_2O_5)/Y_2O_3$ | 7.0 | 9.3 | 9.3 | 4.6 | 10.3 | 10.3 | 12.3 | 12.0 | 7.7 |
| $Al_2O_3/(Li_2O + ZrO_2 + P_2O_5)$ | 0.29 | 0.29 | 0.29 | 0.27 | 0.55 | 0.52 | 0.27 | 0.28 | 0.35 |
| $Na_2O/Y_2O_3$ | 0.0 | 1.3 | 0.7 | 0.0 | 0.0 | 0.0 | 0.0 | 0.0 | 0.0 |
| $Y_2O_3/(Al_2O_3 + SiO_2)$ | 0.06 | 0.05 | 0.05 | 0.15 | 0.05 | 0.05 | 0.05 | 0.05 | 0.04 |
| Crystal phase | Lithium monosilicate | Lithium monosilicate | Lithium monosilicate | Lithium monosilicate and lithium phosphate | Lithium monosilicate and lithium phosphate | Lithium monosilicate and lithium phosphate | Lithium monosilicate and lithium phosphate | Lithium monosilicate and lithium phosphate | Lithium monosilicate |

TABLE 7-continued

| Component (wt %) | 19# | 20# | 21# | 22# | 23# | 24# | 25# | 26# | 27# |
|---|---|---|---|---|---|---|---|---|---|
| Crystallinity (%) | 68 | 69 | 68 | 55 | 56 | 57 | 58 | 59 | 54 |
| Grain size (nm) | 35 | 35 | 35 | 35 | 35 | 35 | 35 | 35 | 35 |
| Haze at the thickness of 1 mm (%) | 0.12 | 0.12 | 0.12 | 0.11 | 0.09 | 0.09 | 0.1 | 0.1 | 0.09 |
| \|B\| value at the thickness of 1 mm | 0.48 | 0.48 | 0.48 | 0.58 | 0.48 | 0.48 | 0.48 | 0.48 | 0.48 |
| $H_v$ (kgf/mm$^2$) | 695 | 698 | 690 | 675 | 674 | 665 | 668 | 673 | 663 |
| Average light transmittance at the thickness of 1 mm at 400-800 nm (%) | 90 | 90 | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 | 92 | 92 |
| Body drop height (mm) | 1100 | 1100 | 1100 | 1000 | 1000 | 1000 | 1000 | 1000 | 1000 |
| $\alpha_{20°C.-120°C.}$ (×10$^{-7}$/K) | 86 | 88 | 85 | 75 | 76 | 77 | 77 | 83 | 85 |
| $n_d$ | 1.5710 | 1.5712 | 1.5705 | 1.5715 | 1.5706 | 1.5759 | 1.5733 | 1.5719 | 1.5789 |

TABLE 8

| Component (wt %) | 28# | 29# | 30# | 31# | 32# | 33# | 34# |
|---|---|---|---|---|---|---|---|
| SiO$_2$ | 67 | 68 | 69 | 70 | 49 | 50 | 55 |
| Al$_2$O$_3$ | 8 | 8 | 8 | 8 | 10 | 10 | 8 |
| Li$_2$O | 10 | 10 | 10 | 10 | 12 | 15 | 15 |
| Na$_2$O | 1 | 0 | 0 | 0 | 2 | 6 | 2 |
| P$_2$O$_5$ | 2 | 2 | 2 | 2 | 4 | 4 | 4 |
| ZrO$_2$ | 9 | 9 | 8 | 7 | 15 | 9 | 9 |
| Y$_2$O$_3$ | 3 | 3 | 3 | 3 | 8 | 1 | 2 |
| K$_2$O | 0 | 0 | 0 | 0 | 0 | 0 | 5 |
| B$_2$O$_3$ | 0 | 0 | 0 | 0 | 0 | 5 | 0 |
| ZnO | 0 | 0 | 0 | 0 | 0 | 0 | 0 |
| MgO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| TiO$_2$ | 0 | 0 | 0 | 0 | 0 | 0 | 0 |
| CaO | 0 | 0 | 0 | 0 | 0 | 0 | 0 |
| La$_2$O$_3$ | 0 | 0 | 0 | 0 | 0 | 0 | 0 |
| Gd$_2$O$_3$ | 0 | 0 | 0 | 0 | 0 | 0 | 0 |
| Yb$_2$O$_3$ | 0 | 0 | 0 | 0 | 0 | 0 | 0 |
| Sb$_2$O$_3$ | 0 | 0 | 0 | 0 | 0 | 0 | 0 |
| In total | 100 | 100 | 100 | 100 | 100 | 100 | 100 |
| Y$_2$O$_3$/ZrO$_2$ | 0.3 | 0.3 | 0.4 | 0.4 | 0.5 | 0.1 | 0.2 |
| (Li$_2$O + ZrO$_2$ + P$_2$O$_5$)/Y$_2$O$_3$ | 7.0 | 7.0 | 6.7 | 6.3 | 3.9 | 28.0 | 14.0 |
| Al$_2$O$_3$/(Li$_2$O + ZrO$_2$ + P$_2$O$_5$) | 0.38 | 0.38 | 0.40 | 0.42 | 0.32 | 0.36 | 0.29 |
| Na$_2$O/Y$_2$O$_3$ | 0.3 | 0.0 | 0.0 | 0.0 | 0.3 | 6.0 | 1.0 |
| Y$_2$O$_3$/(Al$_2$O$_3$ + SiO$_2$) | 0.04 | 0.04 | 0.04 | 0.04 | 0.14 | 0.02 | 0.03 |
| Crystal phase | Lithium monosilicate | Lithium monosilicate | Lithium monosilicate | Lithium monosilicate | Lithium monosilicate | Lithium monosilicate | Lithium monosilicate |
| Crystallinity (%) | 53 | 55 | 55 | 51 | 55 | 58 | 59 |
| Grain size (nm) | 35 | 35 | 35 | 35 | 35 | 40 | 35 |
| Haze at the thickness of 1 mm (%) | 0.09 | 0.09 | 0.09 | 0.09 | 0.14 | 0.14 | 0.1 |
| \|B\| value at the thickness of 1 mm | 0.48 | 0.48 | 0.48 | 0.50 | 0.48 | 0.48 | 0.48 |
| $H_v$ (kgf/mm$^2$) | 653 | 654 | 663 | 668 | 685 | 686 | 689 |
| Average light transmittance at the thickness of 1 mm at 400-800 nm (%) | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 |
| Body drop height (mm) | 1000 | 1000 | 1000 | 1000 | 1000 | 1000 | 1000 |
| $\alpha_{20°C.-120°C.}$ (×10$^{-7}$/K) | 86 | 88 | 82 | 86 | 88 | 89 | 88 |
| $n_d$ | 1.5742 | 1.5779 | 1.5732 | 1.5767 | 1.5711 | 1.5732 | 1.5711 |

Example of Microcrystalline Glass Product

This example adopts the above-mentioned method for manufacturing a microcrystalline glass product to obtain the microcrystalline glass product having the components as shown in Tables 9-12. In addition, the characteristics of each microcrystalline glass product are measured by the test method described in the present invention, and the measurement results are shown in Tables 9-12.

TABLE 9

| Component (wt %) | 1# | 2# | 3# | 4# | 5# | 6# | 7# | 8# | 9# |
|---|---|---|---|---|---|---|---|---|---|
| $SiO_2$ | 53 | 54 | 55 | 56 | 57 | 58 | 59 | 60 | 61 |
| $Al_2O_3$ | 11.5 | 11 | 10 | 11 | 11 | 8 | 8 | 8 | 9 |
| $Li_2O$ | 13 | 13.5 | 15 | 14.5 | 15 | 16 | 18 | 13 | 13 |
| $Na_2O$ | 1 | 1 | 2 | 1 | 2 | 1 | 1 | 1 | 3 |
| $P_2O_5$ | 4 | 4 | 4 | 4 | 5 | 6 | 4 | 5 | 4 |
| $ZrO_2$ | 10 | 11 | 8.5 | 8 | 7 | 8 | 7 | 10 | 7 |
| $Y_2O_3$ | 6 | 5 | 4 | 3 | 3 | 3 | 3 | 3 | 3 |
| $K_2O$ | 1 | 0 | 0 | 0 | 0 | 0 | 0 | 0 | 0 |
| $B_2O_3$ | 0 | 0 | 0 | 2 | 0 | 0 | 0 | 0 | 0 |
| ZnO | 0 | 0 | 0 | 0 | 0 | 0 | 0 | 0 | 0 |
| MgO | 0 | 0 | 1 | 0 | 0 | 0 | 0 | 0 | 0 |
| SrO | 0 | 0 | 0 | 0 | 0 | 0 | 0 | 0 | 0 |
| BaO | 0 | 0 | 0 | 0 | 0 | 0 | 0 | 0 | 0 |
| $TiO_2$ | 0 | 0 | 0 | 0 | 0 | 0 | 0 | 0 | 0 |
| CaO | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0.5 | 0.5 | 0.5 | 0.5 | 0 | 0 | 0 | 0 | 0 |
| In total | 100 | 100 | 100 | 100 | 100 | 100 | 100 | 100 | 100 |
| $Y_2O_3/ZrO_2$ | 0.6 | 0.5 | 0.5 | 0.4 | 0.4 | 0.4 | 0.4 | 0.3 | 0.4 |
| $(Li_2O + ZrO_2 + P_2O_5)/Y_2O_3$ | 4.5 | 5.7 | 6.9 | 8.8 | 9.0 | 10.0 | 9.7 | 9.3 | 8.0 |
| $Al_2O_3/(Li_2O + ZrO_2 + P_2O_5)$ | 0.43 | 0.39 | 0.36 | 0.42 | 0.41 | 0.27 | 0.28 | 0.29 | 0.38 |
| $Na_2O/Y_2O_3$ | 0.2 | 0.2 | 0.5 | 0.3 | 0.7 | 0.3 | 0.3 | 0.3 | 1.0 |
| $Y_2O_3/(Al_2O_3 + SiO_2)$ | 0.09 | 0.08 | 0.06 | 0.04 | 0.04 | 0.05 | 0.04 | 0.04 | 0.04 |
| Surface stress (MPa) | 775 | 805 | 778 | 776 | 786 | 769 | 780 | 856 | 780 |
| Ion-exchange layer depth (μm) | 28 | 26 | 26 | 48 | 49 | 45 | 45 | 45 | 46 |
| Four-point bending (MPa) | 775 | 758 | 736 | 755 | 843 | 855 | 795 | 810 | 862 |
| Drop ball test height (mm) | 1600 | 1500 | 1600 | 1600 | 1600 | 1600 | 1600 | 1600 | 1500 |
| Fracture toughness ($MPa \cdot m^{1/2}$) | 1.3 | 1.4 | 1.3 | 1.3 | 1.5 | 1.4 | 1.3 | 1.3 | 1.3 |
| $H_v$ ($kgf/mm^2$) | 766 | 763 | 770 | 771 | 766 | 767 | 761 | 763 | 765 |
| Crystallinity (%) | 80 | 84 | 90 | 80 | 82 | 88 | 75 | 74 | 73 |
| Grain size (nm) | 25 | 25 | 30 | 25 | 25 | 25 | 25 | 30 | 25 |
| Haze at the thickness of 1 mm (%) | 0.09 | 0.09 | 0.09 | 0.09 | 0.09 | 0.09 | 0.09 | 0.09 | 0.09 |
| Average light transmittance at the thickness of 1 mm at 400-800 nm (%) | 90 | 90 | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 | 92 | 92 |

TABLE 10

| Component (wt %) | 10# | 11# | 12# | 13# | 14# | 15# | 16# | 17# | 18# |
|---|---|---|---|---|---|---|---|---|---|
| $SiO_2$ | 62 | 63 | 53 | 53 | 50 | 51 | 52 | 64 | 65 |
| $Al_2O_3$ | 8 | 8 | 12 | 9 | 15 | 8 | 14 | 8 | 8 |
| $Li_2O$ | 14.5 | 13 | 20 | 15 | 13 | 22 | 15 | 13 | 13 |
| $Na_2O$ | 1 | 1 | 1 | 1 | 0 | 1 | 4 | 0 | 0 |
| $P_2O_5$ | 4 | 5 | 4 | 7 | 9 | 4 | 4 | 4 | 4 |
| $ZrO_2$ | 7 | 7 | 7 | 12 | 6 | 12 | 8 | 7 | 8 |
| $Y_2O_3$ | 3 | 3 | 3 | 3 | 7 | 2 | 3 | 1 | 1 |
| $K_2O$ | 0 | 0 | 0 | 0 | 0 | 0 | 0 | 0 | 0 |
| $B_2O_3$ | 0 | 0 | 0 | 0 | 0 | 0 | 0 | 3 | 0 |
| ZnO | 0 | 0 | 0 | 0 | 0 | 0 | 0 | 0 | 1 |
| MgO | 0 | 0 | 0 | 0 | 0 | 0 | 0 | 0 | 0 |
| SrO | 0 | 0 | 0 | 0 | 0 | 0 | 0 | 0 | 0 |
| BaO | 0 | 0 | 0 | 0 | 0 | 0 | 0 | 0 | 0 |
| $TiO_2$ | 0 | 0 | 0 | 0 | 0 | 0 | 0 | 0 | 0 |
| CaO | 0 | 0 | 0 | 0 | 0 | 0 | 0 | 0 | 0 |
| $La_2O_3$ | 0 | 0 | 0 | 0 | 0 | 0 | 0 | 0 | 0 |

TABLE 10-continued

| Component (wt %) | 10# | 11# | 12# | 13# | 14# | 15# | 16# | 17# | 18# |
|---|---|---|---|---|---|---|---|---|---|
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0.5 | 0 | 0 | 0 | 0 | 0 | 0 | 0 | 0 |
| In total | 100 | 100 | 100 | 100 | 100 | 100 | 100 | 100 | 100 |
| $Y_2O_3/ZrO_2$ | 0.4 | 0.4 | 0.4 | 0.3 | 1.2 | 0.2 | 0.4 | 0.1 | 0.1 |
| $(Li_2O + ZrO_2 + P_2O_5)/Y_2O_3$ | 8.5 | 8.3 | 10.3 | 11.3 | 4.0 | 19.0 | 9.0 | 24.0 | 25.0 |
| $Al_2O_3/(Li_2O + ZrO_2 + P_2O_5)$ | 0.31 | 0.32 | 0.39 | 0.26 | 0.54 | 0.21 | 0.52 | 0.33 | 0.32 |
| $Na_2O/Y_2O_3$ | 0.3 | 0.3 | 0.3 | 0.3 | 0.0 | 0.5 | 1.3 | 0.0 | 0.0 |
| $Y_2O_3/(Al_2O_3 + SiO_2)$ | 0.04 | 0.04 | 0.05 | 0.05 | 0.11 | 0.03 | 0.05 | 0.01 | 0.01 |
| Surface stress (MPa) | 785 | 790 | 765 | 773 | 655 | 659 | 688 | 656 | 688 |
| Ion-exchange layer depth (μm) | 45 | 45 | 55 | 46 | 28 | 40 | 45 | 35 | 35 |
| Four-point bending (MPa) | 835 | 799 | 745 | 776 | 704 | 669 | 691 | 633 | 688 |
| Drop ball test height (mm) | 1600 | 1600 | 1700 | 1600 | 1400 | 1400 | 1400 | 1400 | 1400 |
| Fracture toughness ($MPa \cdot m^{1/2}$) | 1.5 | 1.3 | 1.4 | 1.3 | 1.1 | 1.2 | 1.2 | 1.2 | 1.2 |
| $H_v$ ($kgf/mm^2$) | 768 | 769 | 763 | 762 | 703 | 708 | 711 | 713 | 724 |
| Crystallinity (%) | 77 | 76 | 85 | 89 | 67 | 68 | 65 | 61 | 62 |
| Grain size (nm) | 25 | 25 | 30 | 25 | 35 | 35 | 35 | 40 | 40 |
| Haze at the thickness of 1 mm (%) | 0.09 | 0.09 | 0.09 | 0.09 | 0.11 | 0.11 | 0.12 | 0.14 | 0.14 |
| Average light transmittance at the thickness of 1 mm at 400-800 nm (%) | 90 | 90 | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 | 92 | 92 |

TABLE 11

| Component (wt %) | 19# | 20# | 21# | 22# | 23# | 24# | 25# | 26# | 27# |
|---|---|---|---|---|---|---|---|---|---|
| $SiO_2$ | 54 | 55 | 55 | 45 | 46 | 47 | 48 | 49 | 66 |
| $Al_2O_3$ | 8 | 8 | 8 | 10 | 17 | 16 | 10 | 10 | 8 |
| $Li_2O$ | 15 | 15 | 15 | 25 | 18 | 18 | 24 | 23 | 10 |
| $Na_2O$ | 0 | 4 | 2 | 0 | 0 | 0 | 0 | 0 | 0 |
| $P_2O_5$ | 4 | 4 | 4 | 4 | 4 | 4 | 4 | 4 | 4 |
| $ZrO_2$ | 9 | 9 | 9 | 8 | 9 | 9 | 9 | 9 | 9 |
| $Y_2O_3$ | 4 | 3 | 3 | 8 | 3 | 3 | 3 | 3 | 3 |
| $K_2O$ | 4 | 0 | 2 | 0 | 0 | 0 | 0 | 0 | 0 |
| $B_2O_3$ | 0 | 0 | 0 | 0 | 0 | 0 | 0 | 0 | 0 |
| ZnO | 0 | 0 | 0 | 0 | 0 | 0 | 2 | 0 | 0 |
| MgO | 0 | 0 | 0 | 0 | 0 | 0 | 0 | 2 | 0 |
| SrO | 2 | 0 | 0 | 0 | 3 | 0 | 0 | 0 | 0 |
| BaO | 0 | 2 | 0 | 0 | 0 | 3 | 0 | 0 | 0 |
| $TiO_2$ | 0 | 0 | 2 | 0 | 0 | 0 | 0 | 0 | 0 |
| CaO | 0 | 0 | 0 | 0 | 0 | 0 | 0 | 0 | 0 |
| $La_2O_3$ | 0 | 0 | 0 | 0 | 0 | 0 | 0 | 0 | 0 |
| $Gd_2O_3$ | 0 | 0 | 0 | 0 | 0 | 0 | 0 | 0 | 0 |
| $Yb_2O_3$ | 0 | 0 | 0 | 0 | 0 | 0 | 0 | 0 | 0 |
| $Sb_2O_3$ | 0 | 0 | 0 | 0 | 0 | 0 | 0 | 0 | 0 |
| In total | 100 | 100 | 100 | 100 | 100 | 100 | 100 | 100 | 100 |
| $Y_2O_3/ZrO_2$ | 0.4 | 0.3 | 0.3 | 1.0 | 0.3 | 0.3 | 0.3 | 0.3 | 0.3 |
| $(Li_2O + ZrO_2 + P_2O_5)/Y_2O_3$ | 7.0 | 9.3 | 9.3 | 4.6 | 10.3 | 10.3 | 12.3 | 12.0 | 7.7 |
| $Al_2O_3/(Li_2O + ZrO_2 + P_2O_5)$ | 0.29 | 0.29 | 0.29 | 0.27 | 0.55 | 0.52 | 0.27 | 0.28 | 0.35 |
| $Na_2O/Y_2O_3$ | 0.0 | 1.3 | 0.7 | 0.0 | 0.0 | 0.0 | 0.0 | 0.0 | 0.0 |
| $Y_2O_3/(Al_2O_3 + SiO_2)$ | 0.06 | 0.05 | 0.05 | 0.15 | 0.05 | 0.05 | 0.05 | 0.05 | 0.04 |
| Surface stress (MPa) | 673 | 697 | 656 | 638 | 635 | 635 | 648 | 649 | 625 |
| Ion-exchange layer depth (μm) | 35 | 35 | 35 | 25 | 35 | 35 | 35 | 35 | 30 |
| Four-point bending (MPa) | 698 | 668 | 695 | 658 | 678 | 635 | 645 | 655 | 635 |
| Drop ball test height (mm) | 1400 | 1400 | 1300 | 1300 | 1600 | 1600 | 1700 | 1600 | 1600 |
| Fracture toughness ($MPa \cdot m^{1/2}$) | 1.2 | 1.2 | 1.2 | 1.1 | 1.1 | 1.2 | 1.2 | 1.2 | 1.2 |

TABLE 11-continued

| Component (wt %) | 19# | 20# | 21# | 22# | 23# | 24# | 25# | 26# | 27# |
|---|---|---|---|---|---|---|---|---|---|
| $H_v$ (kgf/mm$^2$) | 706 | 720 | 721 | 713 | 714 | 716 | 711 | 705 | 704 |
| Crystallinity (%) | 68 | 69 | 68 | 55 | 56 | 57 | 58 | 59 | 54 |
| Grain size (nm) | 35 | 35 | 35 | 35 | 35 | 35 | 35 | 35 | 35 |
| Haze at the thickness of 1 mm (%) | 0.12 | 0.12 | 0.12 | 0.11 | 0.09 | 0.09 | 0.1 | 0.1 | 0.09 |
| Average light transmittance at the thickness of 1 mm at 400-800 nm (%) | 90 | 90 | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 | 92 | 92 |

TABLE 12

| Component (wt %) | 28# | 29# | 30# | 31# | 32# | 33# | 34# |
|---|---|---|---|---|---|---|---|
| $SiO_2$ | 67 | 68 | 69 | 70 | 49 | 50 | 55 |
| $Al_2O_3$ | 8 | 8 | 8 | 8 | 10 | 10 | 8 |
| $Li_2O$ | 10 | 10 | 10 | 10 | 12 | 15 | 15 |
| $Na_2O$ | 1 | 0 | 0 | 0 | 2 | 6 | 2 |
| $P_2O_5$ | 2 | 2 | 2 | 2 | 4 | 4 | 4 |
| $ZrO_2$ | 9 | 9 | 8 | 7 | 15 | 9 | 9 |
| $Y_2O_3$ | 3 | 3 | 3 | 3 | 8 | 1 | 2 |
| $K_2O$ | 0 | 0 | 0 | 0 | 0 | 0 | 5 |
| $B_2O_3$ | 0 | 0 | 0 | 0 | 0 | 5 | 0 |
| ZnO | 0 | 0 | 0 | 0 | 0 | 0 | 0 |
| MgO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $TiO_2$ | 0 | 0 | 0 | 0 | 0 | 0 | 0 |
| CaO | 0 | 0 | 0 | 0 | 0 | 0 | 0 |
| $La_2O_3$ | 0 | 0 | 0 | 0 | 0 | 0 | 0 |
| $Gd_2O_3$ | 0 | 0 | 0 | 0 | 0 | 0 | 0 |
| $Yb_2O_3$ | 0 | 0 | 0 | 0 | 0 | 0 | 0 |
| $Sb_2O_3$ | 0 | 0 | 0 | 0 | 0 | 0 | 0 |
| In total | 100 | 100 | 100 | 100 | 100 | 100 | 100 |
| $Y_2O_3/ZrO_2$ | 0.3 | 0.3 | 0.4 | 0.4 | 0.5 | 0.1 | 0.2 |
| $(Li_2O + ZrO_2 + P_2O_5)/Y_2O_3$ | 7.0 | 7.0 | 6.7 | 6.3 | 3.9 | 28.0 | 14.0 |
| $Al_2O_3/(Li_2O + ZrO_2 + P_2O_5)$ | 0.38 | 0.38 | 0.40 | 0.42 | 0.32 | 0.36 | 0.29 |
| $Na_2O/Y_2O_3$ | 0.3 | 0.0 | 0.0 | 0.0 | 0.3 | 6.0 | 1.0 |
| $Y_2O_3/(Al_2O_3 + SiO_2)$ | 0.04 | 0.04 | 0.04 | 0.04 | 0.14 | 0.02 | 0.03 |
| Surface stress (MPa) | 612 | 638 | 648 | 635 | 645 | 601 | 645 |
| Ion-exchange layer depth (μm) | 45 | 30 | 30 | 30 | 45 | 45 | 35 |
| Four-point bending (MPa) | 648 | 651 | 645 | 638 | 679 | 625 | 612 |
| Drop ball test height (mm) | 1600 | 1700 | 1600 | 1700 | 1300 | 1400 | 1500 |
| Fracture toughness (MPa · m$^{1/2}$) | 1.2 | 1.2 | 1.2 | 1.2 | 1.2 | 1.2 | 1.2 |
| $H_v$ (kgf/mm$^2$) | 713 | 712 | 709 | 705 | 701 | 711 | 701 |
| Crystallinity (%) | 53 | 55 | 55 | 51 | 55 | 58 | 59 |
| Grain size (nm) | 35 | 35 | 35 | 35 | 35 | 40 | 35 |
| Haze at the thickness of 1 mm (%) | 0.09 | 0.09 | 0.09 | 0.09 | 0.14 | 0.14 | 0.1 |
| Average light transmittance at the thickness of 1 mm at 400-800 nm (%) | 90 | 90 | 90 | 90 | 90 | 90 | 90 |
| Light transmittance at the thickness of 1 mm at the wavelength of 550 nm (%) | 92 | 92 | 92 | 92 | 92 | 92 | 92 |

What is claimed is:

1. A microcrystalline glass product, comprising following components in percentage by weight: $SiO_2$: 45-70%; $Al_2O_3$: 8-18%; $Li_2O$: 10-25%; $ZrO_2$: 5-15%; $P_2O_5$: 2-10%; $Y_2O_3$: greater than 0 but less than or equal to 4%; and $Y_2O_3/(Al_2O_3+SiO_2)$ is greater than 0 but less than or equal to 0.06.

2. The microcrystalline glass product according to claim 1, further comprising the following components in percentage by weight: $K_2O$: 0-5%; and/or MgO: 0-2%; and/or ZnO: 0-2%; and/or $Na_2O$: 0-6%; and/or SrO: 0-5%; and/or BaO: 0-5%; and/or CaO: 0-5%; and/or $TiO_2$: 0-5%; and/or $B_2O_3$: 0-5%; and/or $Ln_2O_3$: 0-5%; and/or a clarifying agent: 0-2%, wherein $Ln_2O_3$ is one or more of $La_2O_3$, $Gd_2O_3$, and $Yb_2O_3$, and the clarifying agent is one or more of $Sb_2O_3$, $Sn_2O_2$, SnO, $CeO_2$, F, Cl, and Br.

3. The microcrystalline glass product according to claim 1, wherein the components are expressed in percentage by weight, and a content of each component satisfies more than one of following five situations:
1) $Y_2O_3/ZrO_2$ is greater than 0;
2 $(Li_2O+ZrO_2+P_2O_5)/Y_2O_3$ is 2.5-50.0;
3) $Al_2O_3/(Li_2O+ZrO_2+P_2O_5)$ is 0.16-0.9;
4 $Na_2O/Y_2O_3$ is 6.0 or less; or
5) $Y_2O_3$: 1-4%.

4. The microcrystalline glass product according to claim 1, comprising the following components in percentage by weight: $SiO_2$: 53-63%; and/or $Al_2O_3$: 8-12%; and/or $Li_2O$: 14-21%; and/or $ZrO_2$: 7-12%; and/or $P_2O_5$: 4-8%; and/or $K_2O$: 0-2%; and/or $Y_2O_3$: 2-4%; and/or $B_2O_3$: 0-2%; and/or $Na_2O$: 1.5-4%; and/or SrO: 0-1%; and/or $TiO_2$: 0-1%; and/or BaO: 0-1%; and/or CaO: 0-1%; and/or $Ln_2O_3$: 0-3%; and/or a clarifying agent: 0-0.5%, wherein $Ln_2O_3$ is one or more of $La_2O_3$, $Gd_2O_3$, and $Yb_2O_3$, and the clarifying agent is one or more of $LSb_2O_3$, $SnO_2$, SnO, $CeO_2$, F, Cl, and Br.

5. The microcrystalline glass product according to claim 1, wherein the components are expressed in percentage by weight, and a content of each component satisfies more than one of the following five situations:
1) $Y_2O_3/ZrO_2$ is 0.2-0.6;
2) $(Li_2O+ZrO_2+P_2O_5)/Y_2O_3$ is 4.0-21.0;
3) $Al_2O_3/(Li_2O+ZrO_2+P_2O_5)$ is 0.19-0.5;
4) $Na_2O/Y_2O_3$ is 0.3-2.0; or
5) $Y_2O_3/(Al_2O_3+SiO_2)$ is 0.03-0.06.

6. The microcrystalline glass product according to claim 1, wherein a crystal phase of the microcrystalline glass product comprises lithium monosilicate and/or lithium phosphate.

7. The microcrystalline glass product according to claim 1, wherein a crystal phase of the microcrystalline glass product mainly comprises lithium monosilicate;
lithium monosilicate has a higher weight percentage than other crystal phases, and lithium monosilicate accounts for 10-63.5% by weight of the microcrystalline glass product.

8. The microcrystalline glass product according to claim 1, wherein the microcrystalline glass product comprises a lithium phosphate crystal phase, and the lithium phosphate crystal phase accounts for 3-15% by weight of the microcrystalline glass product.

9. The microcrystalline glass product according to claim 1, wherein a surface stress of the microcrystalline glass product is 600 MPa or more; and/or a four-point bending strength is 600 MPa or more; and/or an ion-exchange layer depth is 20 μm or more;
and/or a drop ball test height is 1300 mm or more; and/or a fracture toughness is 1 $MPa.M^{1/2}$ or more; and/or a Vickers hardness is 700 $kgf/mm^2$ or more; and/or a crystallinity is 50% or more; and/or a crystal grain size is 50 nm or less; and/or a haze of the microcrystalline glass product with a thickness of 1 mm or less is 0.15% or less; and/or an average transmittance of the microcrystalline glass product with the thickness of 1 mm or less at a wavelength of 400-800 nm is 89% or more; and/or a transmittance of the microcrystalline glass product with the thickness of 1 mm or less at the wavelength of 550 nm is 91% or more; and/or an average light |B| value of the microcrystalline glass product with the thickness of 1 mm or less at 400-800 nm is 0.6 or less.

10. The microcrystalline glass product according to claim 1, wherein a surface stress of the microcrystalline glass product is 700 MPa or more; and/or a four-point bending strength is 700 MPa or more; and/or an ion-exchange layer depth is 40 μm or more; and/or a drop ball test height is 1500 mm or more; and/or a fracture toughness is 1.2 $MPa·m^{1/2}$ or more; and/or a Vickers hardness is 730 $kgf/mm^2$ or more; and/or a crystallinity is 70% or more; and/or a crystal grain size is 30 nm or less; and/or a haze of the microcrystalline glass product with a thickness of 1 mm or less is 0.1% or less; and/or an average transmittance of the microcrystalline glass product with the thickness of 1 mm or less at the wavelength of 400-800 nm is 89% or more; and/or a transmittance of the microcrystalline glass product with the thickness of 1 mm or less at the wavelength of 550 nm is 91% or more; and/or an average light |B| value of the microcrystalline glass product with the thickness of 1 mm or less at 400-800 nm is 0.5 or less.

11. The microcrystalline glass product according to claim 1, wherein the microcrystalline glass product comprises a colorant, and the colorant comprises following components in percentage by weight: NiO: 0-4%; and/or $Ni_2O_3$: 0-4%; and/or CoO: 0-2%; and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

12. Microcrystalline glass, comprising following components in percentage by weight: $SiO_2$: 45-70%; $Al_2O_3$: 8-18%; $Li_2O$: 10-25%; $ZrO_2$: 5-15%; $P_2O_5$: 2-10%; $Y_2O_3$: greater than 0 but less than or equal to 4%; and $Y_2O_3/(Al_2O_3+SiO_2)$ is greater than 0 but less than or equal to 0.06.

13. The microcrystalline glass according to claim 12, further comprising the following components in percentage by weight: $K_2O$: 0-5%; and/or MgO: 0-2%; and/or ZnO: 0-2%; and/or $Na_2O$: 0-6%; and/or SrO: 0-5%; and/or BaO: 0-5%; and/or $TiO_2$: 0-5%; and/or CaO: 0-5%; and/or $B_2O_3$: 0-5%; and/or $Ln_2O_3$: 0-5%; and/or a clarifying agent: 0-2%, wherein $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

14. The microcrystalline glass according to claim 12, wherein the components are expressed in percentage by weight, and a content of each component satisfies more than one of following five situations:
1) $Y_2O_3/ZrO_2$ is greater than 0;
2) $(Li_2O+ZrO_2+P_2O_5)/Y_2O_3$ is 2.5-50.0;
3) $Al_2O_3/(Li_2O+ZrO_2+P_2O_5)$ is 0.16-0.9;
4) $Na_2O/Y_2O_3$ is 6.0 or less; or
5) $Y_2O_3$: 1-4%.

15. The microcrystalline glass according to claim 12, comprising the following components in percentage by weight: $SiO_2$: 53-63%; and/or $Al_2O_3$: 8-12%; and/or $Li_2O$: 14-21%; and/or $ZrO_2$: 7-12%; and/or $P_2O_5$: 4-8%; and/or $K_2O$: 0-2%; and/or $Y_2O_3$: 2-4%; and/or $B_2O_3$: 0-2%; and/or $Na_2O$: 1.5-4%; and/or SrO: 0-1%; and/or $TiO_2$: 0-1%; and/or BaO: 0-1%; and/or CaO: 0-1%; and/or $Ln_2O_3$: 0-3%; and/or a clarifying agent: 0-0.5%, wherein $Ln_2O_3$ is one or more of $La_2O_3$, $Gd_2O_3$, and $Yb_2O_3$, and the clarifying agent is one or more of $Sb_2O_3$, $SnO_2$, SnO, $CeO_2$, F, Cl, and Br.

16. The microcrystalline glass according to claim 12, wherein the components are expressed in percentage by weight, and a content of each component satisfies more than one of following five situations:
1) $Y_2O_3/ZrO_2$ is 0.2-0.6;
2) $(Li_2O+ZrO_2+P_2O_5)/Y_2O_3$ is 4.0-21.0;
3) $Al_2O_3/(Li_2O+ZrO_2+P_2O_5)$ is 0.19-0.5;
4) $Na_2O/Y_2O_3$ is 0.3-2.0; or
5) $Y_2O_3/(Al_2O_3+SiO_2)$ is 0.03-0.06.

17. The microcrystalline glass according to claim 12, wherein a crystal phase of the microcrystalline glass comprises lithium monosilicate and/or lithium phosphate.

18. The microcrystalline glass according to claim 12, wherein a crystal phase of the microcrystalline glass mainly comprises lithium monosilicate; lithium monosilicate has a higher weight percentage than other crystal phases, and lithium monosilicate accounts for 10-63.5% by weight of the microcrystalline glass.

19. The microcrystalline glass according to claim 12, wherein the microcrystalline glass comprises a lithium phosphate crystal phase, and the lithium phosphate crystal phase accounts for 3-15% by weight of the microcrystalline glass.

20. The microcrystalline glass according to claim 12, wherein a crystallinity of the microcrystalline glass is 50% or more; and/or a crystal grain size is 50 nm or less; and/or a coefficient of thermal expansion is $75\text{-}95\times10^{-7}$/K; and/or a refractive index is 1.5700-1.5800; and/or a body drop height is 1000 mm or more; and/or a Vickers hardness is 650 $kgf/mm^2$ or more; and/or a haze of the microcrystalline glass with a thickness of 1 mm or less is 0.15% or less; and/or an average transmittance of the microcrystalline glass with the thickness of 1 mm or less at a wavelength of 400-800 nm is 89% or more; and/or a transmittance of the microcrystalline glass with the thickness of 1 mm or less at the wavelength of 550 nm is 91% or more; and/or an average light B value of the microcrystalline glass with the thickness of 1 mm or less at 400-800 nm is 0.6 or less.

21. The microcrystalline glass according to claim 12, wherein a crystallinity of the microcrystalline glass is 70% or more; and/or a crystal grain size is 30 nm or less; and/or a body drop height is 1200 mm or more; and/or a Vickers hardness is 700 $kgf/mm^2$ or more; and/or a haze of the microcrystalline glass with a thickness of 1 mm or less is 0.1% or less; and/or an average light |B| value of the microcrystalline glass with the thickness of 1 mm or less at 400-800 nm is 0.5 or less.

22. The microcrystalline glass according to claim 12, wherein the microcrystalline glass comprises a colorant, and the colorant comprises the following components in percentage by weight: NiO: 0-4%; and/or $Ni_2O_3$: 0-4%; and/or CoO: 0-2%;
and/or $Co_2O_3$: 0-2%; and/or $Fe_2O_3$: 0-7%; and/or $MnO_2$: 0-4%; and/or $Er_2O_3$: 0-8%; and/or $Nd_2O_3$: 0-8%; and/or $Cu_2O$: 0-4%; and/or $Pr_2O_3$: 0-8%; and/or $CeO_2$: 0-4%.

23. A glass cover plate, comprising the microcrystalline glass according to claim 12.

24. An electronic device, comprising the microcrystalline glass according to claim 12.

25. A method for manufacturing the microcrystalline glass product according to claim 1, wherein the method comprises following steps: forming matrix glass, forming the matrix glass to a microcrystalline glass through a crystallization process, and then forming the microcrystalline glass to a microcrystalline glass product through a chemical strengthening process.

26. The method for manufacturing the microcrystalline glass product according to claim 25, wherein the crystallization process comprises the following steps: increasing the temperature to a prescribed crystallization treatment temperature, after reaching the crystallization treatment temperature, maintaining the temperature for a certain period of time, and then cooling down, wherein the crystallization treatment temperature is 600-750° C., and the holding time at the crystallization treatment temperature is 0-8 hours; or the crystallization process comprises the following steps: performing a nucleation process at a first temperature, and then performing a crystal growth process at a second temperature higher than the nucleation process temperature, wherein the first temperature is 470-630° C., the second temperature is 650-750° C., the holding time at the first temperature is 0-24 hours, and the holding time at the second temperature is 0-10 hours.

27. The method for manufacturing the microcrystalline glass product according to claim 25, wherein the chemical strengthening process comprises: immersing the microcrystalline glass in a salt bath of molten Na salt at a temperature of 430° C. to 470° C. for 6-20 hours; and/or immersing the microcrystalline glass in a salt bath of molten K salt at the temperature of 400° C. to 450° C. for 1-8 hours.

28. A method for manufacturing the microcrystalline glass according to claim 12, wherein the method comprises the following steps: forming matrix glass; and forming the matrix glass to a microcrystalline glass through a crystallization process.

29. The method for manufacturing the microcrystalline glass according to claim 28, wherein the crystallization process comprises the following steps: increasing a temperature to a prescribed crystallization treatment temperature; after reaching the crystallization treatment temperature, maintaining the temperature for a certain period of time;
and then cooling down; the crystallization treatment temperature is 600° C. to 750° C., and the holding time at the crystallization treatment temperature is 0-8 hours.

30. The method for manufacturing the microcrystalline glass according to claim 28, wherein the crystallization process comprises the following steps: performing a nucleation process at a first temperature, and then performing a crystal growth process at a second temperature higher than the nucleation process temperature, wherein the first temperature is 470-630° C., the second temperature is 650-750° C., the holding time at the first temperature is 0-24 hours, and the holding time at the second temperature is 0-10 hours.

\* \* \* \* \*